(12) United States Patent  
Brickfield et al.

(10) Patent No.: US 8,078,330 B2  
(45) Date of Patent: Dec. 13, 2011

(54) AUTOMATIC ENERGY MANAGEMENT AND ENERGY CONSUMPTION REDUCTION, ESPECIALLY IN COMMERCIAL AND MULTI-BUILDING SYSTEMS

(75) Inventors: Peter J. Brickfield, Cambridge, MA (US); Dirk Mahling, Chelmsford, MS (US); Mark Noyes, North Andover, MA (US); David Weaver, Coral Gables, FL (US)

(73) Assignee: Intercap Capital Partners, LLC, Coral Gables, FL (US)

( * ) Notice: Subject to any disclaimer, the term of this patent is extended or adjusted under 35 U.S.C. 154(b) by 74 days.

(21) Appl. No.: 11/889,513

(22) Filed: Aug. 14, 2007

(65) Prior Publication Data  
US 2008/0177423 A1 Jul. 24, 2008

Related U.S. Application Data

(60) Continuation of application No. 10/942,780, filed on Sep. 17, 2004, now abandoned, which is a division of application No. 10/092,507, filed on Mar. 8, 2002, now abandoned.

(51) Int. Cl.  
*G05D 29/00* (2006.01)

(52) U.S. Cl. .......................... 700/291; 700/286

(58) Field of Classification Search ............ 700/291, 700/286  
See application file for complete search history.

(56) References Cited

U.S. PATENT DOCUMENTS 4,023,043 A * 5/1977 Stevenson ............... 307/38  
4,583,090 A 4/1986 Eden et al.  
4,661,914 A 4/1987 Mulokey et al.  
(Continued)

FOREIGN PATENT DOCUMENTS  
WO WO 01/06612 A1 1/2001

OTHER PUBLICATIONS

Marcus R. B. Breekweg, et al, "Development of a Generalized Neural Network Model to Detect Faults in Building Energy Performance—Part 1"; ASHRAE 2000, Minneapolis.

(Continued)

*Primary Examiner* — Ryan Jarrett  
(74) *Attorney, Agent, or Firm* — McGuireWoods LLP

(57) ABSTRACT

Automatic energy management is provided, in even the most complex multi-building system. The necessity of a human operator for managing energy in a complex, multi-building system is reduced and even eliminated. Computer-based monitoring and computer-based recognition of adverse energy events (such as the approach of a new energy peak) is highly advantageous in energy management. Immediate automatic querying of energy users within a system of buildings for energy curtailment possibilities is provided. Such immediate, automatic querying may be answered by the energy users through artificial intelligence and/or neural network technology provided to or programmed into the energy users, and the queried energy users may respond in real-time. Those real-time computerized responses with energy curtailment possibilities may be received automatically by a data processing facility, and processed in real-time. Advantageously, the responses from queried energy users with energy curtailment possibilities may be automatically processed into a round-robin curtailment rotation which may be implemented by a computer-based control system. Thus, impact on occupants is minimized, and energy use and energy cost may be beneficially reduced in an intelligent, real-time manner. The invention also provides for early-recognition of impending adverse energy events, optimal response to a particular energy situation, real-time analysis of energy-related data, etc.

16 Claims, 9 Drawing Sheets

U.S. PATENT DOCUMENTS

| | | | |
|---|---|---|---|
| 4,695,738 A | 9/1987 | Wilmot | |
| 4,855,922 A | 8/1989 | Huddleston et al. | |
| 4,916,328 A | 4/1990 | Culp, III | |
| 5,414,640 A * | 5/1995 | Seem | 700/291 |
| 5,462,225 A | 10/1995 | Massara et al. | |
| 5,543,667 A | 8/1996 | Shavit et al. | |
| 5,544,036 A | 8/1996 | Brown, Jr. et al. | |
| 5,565,855 A | 10/1996 | Knibbe | |
| 5,572,438 A | 11/1996 | Ehlers et al. | |
| 5,576,700 A | 11/1996 | Davis et al. | |
| 5,579,993 A | 12/1996 | Ahmed et al. | |
| 5,627,760 A | 5/1997 | Slutsker et al. | |
| 5,640,153 A | 6/1997 | Hildebrand et al. | |
| 5,682,949 A | 11/1997 | Ratcliffe et al. | |
| 5,708,590 A | 1/1998 | Slutsker et al. | |
| 5,924,486 A | 7/1999 | Ehlers et al. | |
| 5,927,598 A | 7/1999 | Broe | |
| 5,930,773 A | 7/1999 | Crooks et al. | |
| 5,962,989 A | 10/1999 | Baker | |
| 5,971,597 A | 10/1999 | Baldwin et al. | |
| 6,047,274 A | 4/2000 | Johnson et al. | |
| 6,095,426 A | 8/2000 | Ahmed et al. | |
| 6,098,893 A | 8/2000 | Berglund et al. | |
| 6,145,751 A | 11/2000 | Ahmed | |
| 6,167,389 A | 12/2000 | Davis et al. | |
| 6,178,362 B1 | 1/2001 | Woolard et al. | |
| 6,185,483 B1 | 2/2001 | Drees | |
| 6,216,956 B1 | 4/2001 | Ehlers et al. | |
| 6,388,564 B1 | 5/2001 | Piercy et al. | |
| 6,263,260 B1 | 7/2001 | Bodmer et al. | |
| 6,301,527 B1 | 10/2001 | Butland et al. | |
| 6,311,105 B1 | 10/2001 | Budike, Jr. | |
| 6,327,541 B1 | 12/2001 | Pitchford et al. | |
| 6,366,889 B1 | 4/2002 | Zaloom | |
| 6,785,592 B1 | 8/2004 | Smith et al. | |
| 2001/0025209 A1 | 7/2001 | Fukui et al. | |

OTHER PUBLICATIONS

Jeffrey J. Bann, et al.; "Integrating AI Applications in an Energy Managment System"; Nov.-Dec. 1999, vol. 12, No. 6, pp. 53-59.
739-1995 Bronze Book, "IEEE Recommended Practice for Energy Management in Industrial and Commercial Facilities"; 1995, 372 pp.
International Search Report dated May 4, 2005.
PCT Written Opinion mailed Feb. 17, 2006.

\* cited by examiner

DCM-2A LOAD ROTATION
"ROUND ROBIN" APPROACH

ROTATION SCHEDULE / MATRIX EXAMPLE

| ROTATION GROUP | EQUIPMENT ID | CONTROLLED DEVICE ID | MANUAL/AUTO INDICATION ADDRESS | EQUIPMENT STATUS ADDRESS | CURTAILABLE DEMAND SETPOINT (kW) | CURTAILABLE DEMAND (kW) | ON/OFF CONTROL ADDRESS | ON/OFF CONTROL COMMAND | kW RESET CONTROL ADDRESS | kW RESET CONTROL COMMAND | MIN EQUIPMENT OFF TIME (min) | MAX CURTAILMENT DURATION (min) | SETTLING DURATION (min) | REVENUE METER ADDRESS | PROCESS 1 LIMIT ADDRESS | PROCESS 1 LIMIT Min RANGE | PROCESS 1 LIMIT Max RANGE | PROCESS 2 LIMIT ADDRESS | PROCESS 2 LIMIT Min RANGE | PROCESS 2 LIMIT Max RANGE | PROCESS 3 LIMIT ADDRESS | PROCESS 3 LIMIT Min RANGE | PROCESS 3 LIMIT Max RANGE | EQUIP METER ADDRESS | AND INCLUSIONS | OR EXCLUSIONS |
|---|---|---|---|---|---|---|---|---|---|---|---|---|---|---|---|---|---|---|---|---|---|---|---|---|---|---|
| 1 | FOUNTAIN01 | PUMP | 100 | N/A | 0 | 30 | 101 | 1 | N/A | N/A | 30 | 240 | 0 | 10 | N/A | N/A | N/A | N/A | N/A | N/A | N/A | N/A | N/A | 102 | N/A | N/A |
| 2 | AHU01 | REHEAT BANK | 120 | N/A | 0 | 15 | 121 | 1 | N/A | N/A | 10 | 30 | 0 | 20 | 122 | 65F | 70F | N/A | N/A | N/A | N/A | N/A | N/A | 123 | AHU01 | N/A |
| 2 | AHU02 | REHEAT BANK | 140 | N/A | 0 | 15 | 141 | 1 | N/A | N/A | 10 | 30 | 0 | 20 | 142 | 65F | 70F | N/A | N/A | N/A | N/A | N/A | N/A | 143 | AHU02 | N/A |
| 3 | AHU01 | SF VFD | 160 | 161 | 10 | 10 | 162 | 1 | 163 | 0.30 | 10 | 15 | 2 | 20 | 165 | 70F | 78F | 167 | 30% | 80% | 169 | 0ppm | 1200ppm | 170 | N/A | N/A |
| 3 | AHU02 | SF VFD | 180 | 181 | 10 | 10 | 182 | 1 | 183 | 0.35 | 10 | 15 | 2 | 20 | 185 | 70F | 78F | 187 | 30% | 80% | 189 | 0ppm | 1200ppm | 190 | N/A | N/A |
| 3 | AHU04 | SF VFD | 200 | 201 | 10 | 10 | 202 | 1 | 203 | 0.20 | 10 | 15 | 2 | 20 | 205 | 70F | 78F | 207 | 30% | 80% | 209 | 0ppm | 1200ppm | 210 | N/A | N/A |
| 4 | AHU03 | SF VFD | 220 | 221 | 10 | 10 | 222 | 0 | 223 | 0.30 | 10 | 15 | 3 | 20 | 225 | 70F | 78F | 227 | 30% | 80% | 229 | 0ppm | 1200ppm | 230 | N/A | AHU05 |
| 4 | AHU05 | SF VFD | 240 | 241 | 10 | 10 | 242 | 0 | 243 | 0.35 | 10 | 15 | 2 | 20 | 245 | 70F | 78F | 247 | 30% | 80% | 249 | 0ppm | 1200ppm | 250 | N/A | AHU04 |
| 4 | AHU06 | SF VFD | 260 | 261 | 10 | 10 | 262 | 0 | 263 | 0.20 | 10 | 15 | 2 | 20 | 265 | 70F | 78F | 267 | 30% | 80% | 269 | 0ppm | 1200ppm | 270 | N/A | N/A |

SETTINGS TO BE UPDATED BY DEVICE IA
ROTATION GROUPS TO BE UPDATED BY PORTFOLIO IA

*FIG. 7*

AUTOMATIC ENERGY MANAGEMENT AND ENERGY CONSUMPTION REDUCTION, ESPECIALLY IN COMMERCIAL AND MULTI-BUILDING SYSTEMS

This application is a continuation application of U.S. patent application Ser. No. 10/942,780 filed Sep. 17, 2004, now abandoned, which is a divisional application of U.S. application Ser. No. 10/092,507 filed Mar. 8, 2002, now abandoned, which are now incorporated herein by reference.

BACKGROUND OF THE INVENTION

This invention relates generally to systems and methods for managing use of energy, and especially to systems and methods for managing energy use in a complex multi-building context.

A number of factors have combined in recent years to create an electrical energy crisis in many regions of the United States. These include: a shortage of generating capacity; lack of capital investment in new transmission capacity; fuel volatility; and increased demand. The result is a power shortage and difficulties in the energy infrastructure.

Multiple-building systems, such as commonly owned systems of 30, 60 or more buildings, exist throughout the world today. Examples of such building systems include, e.g., university systems. Multiple building systems may be geographically dispersed. Controlling energy consumption, and costs of energy consumption, in such wide-spread building systems presents challenges. See, e.g., U.S. Pat. No. 6,178,362 issued in 2001 to Woolard et al. (assigned to Silicon Energy Corp.), discussing some of the problems of energy management and energy cost management for commercial users who operate large physical plants.

Conventionally, if it was desired to reduce energy consumption by a particular amount (such as a 40 KW reduction in the next two hours) in a multi-building system, which typically use procedure-based systems (such as conventional building management systems, current-generation energy management software, or SCADA-type systems), the building manager was required to conduct all the steps and tasks necessary to accomplish the goal manually. Thus, the question of how to accomplish a specified energy consumption reduction has been heavily human-dependent.

Another question is how to know what specific energy consumption reduction to even want to accomplish. That question, too, has been heavily human-dependent. For example, conventionally, as in U.S. Pat. No. 6,178,362, various meters and data-taking devices have been included in multi-building systems, but the obtained energy data still must be reviewed by a human operator. The necessary inclusion of a human operator in conventional systems has posed certain substantial disadvantages. A human operator may fail to recognize one or more energy-relevant events (such as the threat of a new maximum peak). The diligence, accuracy, speed, and foresight of a human operator necessarily may be limited, contributing to likely missed recognition of such energy relevant events. Human operators may have other duties, so that they not be reviewing relevant energy data at what would be a critical time. Human operators may review data yet fail to appreciate its significance. Human operators may review data, appreciate its significance, and decide on a course of action that may be less than optimal in terms of cost or convenience or comfort.

In any energy management system, reaching a new maximum of peak usage will be expensive and is acknowledged as something to be recognized—and avoided. In a human-based energy management system, the human operator may, or may not, be looking at energy data output at a time when the data is surging towards a new peak. Human operators come in a variety of diligence, attentiveness, and ability levels. Human operators tasked with recognizing surges towards new peaks tend to have other tasks, such that they cannot provide a sufficient level of attention and monitoring to recognize every surge towards a new peak.

Recognition of an energy-relevant event such as a surge towards a new peak is only one aspect of energy management. After recognition that an undesirable energy-relevant event is in progress, there remains the question of what response to take. There is only so much information and so many permutations that a human operator possibly can take into account in a fixed amount of time. The human operator is called upon to decide and act quickly, to avoid the new peak toward which the system is surging. When a human operator recognizes that a new energy peak is being approached, he or she will want to act quickly to avoid reaching the peak and will make a decision to reduce power to one or more power consumers in the system. The human operator is essentially incapable in a limited amount of time of consulting or studying the many different energy users (such as energy-using devices or apparatuses such as air-conditioners, etc.) to ascertain the status of each. A human operator practically speaking can do no more than, at best, execute one or more energy-reducing commands—for at least the reason that the luxury of time is not present.

Software systems that reduce energy consumption in building have been available for many years. These systems work by connecting various pieces of energy-consuming equipment to a computer, which allows the building manager to monitor consumption, and, if necessary, manually reduce it. More sophisticated systems allow third party "service bureaus" to provide these functions for building owners, but they still rely on intensive human intervention to be effective. Heretofore, the analysis and management of energy consumption has been a manual process. Computers and software systems have been able to collect data on energy consumption in particular facilities or on individual pieces of equipment for years. But human beings have had to analyze that information, and decide what action to take to reduce energy consumption. And because many factors affect energy consumption at any given moment—the weather outside, the number of people inside, etc.—it has never been possible to accurately and precisely adjust energy consumption in real time. For example, the Woolard et al. system seeks to use three dimensional facilities navigation tools, energy consumption analysis processes, TCP/IP communication and a World Wide Web (WWW)-based interface, but it is based on sub-systems each of which "performs operations which permit an employee of the entity to control and manage its facilities including its energy consumption." Id., column 2, lines 26-29 (emphasis added).

The electricity crisis in California in 2001 provides a vivid illustration. Although many buildings and factories in the state have energy management systems, the only option available to power suppliers and commercial consumers trying to prevent wholesale network collapse was literally to turn out the lights in "brownouts" and rolling blackouts. The energy management systems in place and the people who monitor them on a daily basis were simply not capable of analyzing all of the potential alternative for reducing energy consumption and doing so quickly. The only choice was to shut down whole systems and businesses. Power outages, even planned power outages, have highly disruptive effects, such as disrupting telephone and computer network equipment, data inaccessibility, etc.

The various government and quasi-government entities charged with ensuring energy availability will continue to push users to curtail their electric power usage in order to avoid the devastating impact of blackouts, either actual or threatened. Avoidance of power outages by large users of power is sought, as having many benefits. Businesses need to have reliable sources of energy. Governments face social and political consequences of chronic energy shortages. Power suppliers cannot meet the demand for electricity in their areas, without building large power-generating reserves, which is not an optimal solution. Thus, it will be appreciated that there are many challenges in the areas of energy consumption, energy shortages, and energy management that remain to be addressed.

SUMMARY OF THE INVENTION

In the present invention, a system comprising artificial intelligence is connected to energy-using devices (such as pieces of equipment). Energy consumption advantageously may be monitored and/or manipulated in real time. Artificial intelligence (such as intelligent agents) may be used to evaluate, forecast and/or control energy consumption patterns. From the system comprising artificial intelligence, control signals may be sent to deploy agreed-upon energy-saving strategies at the building and/or device (energy user) level. Advantageously, energy management can be autonomous, artificial-intelligence based, real-time, over the Internet.

A significant advantage of the invention is to provide maximum energy curtailment with minimal impact to occupants of buildings in the building system. Maximum energy curtailment may be achieved with no greater than a certain defined level of impact to occupants of buildings in the building system.

The invention in a first preferred embodiment provides an energy management system comprising: computer-based monitoring for an adverse energy event in a building system; computer-based recognition of an adverse energy event in the building system; immediate automatic querying of energy users within the building system for energy curtailment possibilities; automatic receipt of responses from queried energy users with energy curtailment possibilities; automatic processing of energy curtailment possibilities into a round-robin curtailment rotation. Preferably, responses from queried energy users with energy curtailment possibilities are automatically processed by a computer with a set of instructions for evaluating how to enact each respective curtailment possibility of each respective energy user offering a curtailment possibility.

In another preferred embodiment, the invention provides a method for minimizing and/or eliminating need for human operator attention in energy management of a building system, comprising: non-human, computerized processing of obtained energy data, wherein the obtained energy data is for at least one energy user in the building system, said processing including (A) automatic determination of whether at least one energy-relevant event is present or (B) continual optimization of a setting of the at least one energy user. Optionally, when a energy-relevant event is automatically determined to be present, the invention provides immediately activating an automatic response to the energy-relevant event. Another preferred but optional example is mentioned, wherein at least one intelligent agent, from the obtained energy data, actually forecasts the peak; wherein the energy-relevant event is a threat of a new maximum peak, and the immediately activated automatic response includes energy reduction interventions to avoid the new maximum peak.

In a further preferred embodiment, the invention provides a computer-based energy management system, comprising: non-human, computerized processing of obtained energy data, wherein the obtained energy data is for at least one energy user in a building system, said processing including automatic determination of whether at least one energy-relevant event is present; and upon recognition of an automatic determination that at least one energy-relevant event, a non-human, computerized response thereto based upon artificial intelligence reasoning.

Additionally, in another preferred embodiment the invention provides a computer-based round-robin rotation system for energy users, wherein the energy users are under computer-based control and are present in a building system, the round-robin rotation system comprising: a series of computer-based energy curtailment commands to each of a plurality of energy users in the building system, wherein (1) each computer-based energy curtailment command in the series of energy curtailment commands; (a) is specific to the energy user to which the curtailment command is directed; (b) has been derived from an energy curtailment offer provided by the energy user; and/or (c) is based on continually learned and observed characteristics of the energy user; and/or (2) an energy user in the plurality of energy users is grouped with other energy users based on similarity with regard to a certain parameter or parameters.

The invention, in another preferred embodiment, provides a computer based method of avoiding a new energy peak, comprising: priming a computer-based system with data as to energy peak(s) already reached in a building system; for current energy usage in the building system, obtaining, in real-time, computer-readable data from which to automatically forecast if a new energy peak is approaching; and real-time automatic processing the obtained computer-readable data to forecast whether or not a new energy peak is approaching. Preferably, if the real-time automatic processing of the obtained computer-readable data provides a forecast that a new energy peak is approaching, an immediate, real-time, automatic response is initiated.

In a further preferred embodiment, the invention provides an energy curtailment system comprising an automatically managed round-robin rotation of a plurality of energy curtailment interventions. Each respective energy curtailment intervention within the plurality of energy curtailment interventions may derived from an energy curtailment offer from a to-be-curtailed energy user. A plurality of to-be-curtailed energy users may be included in a single building or in a multi-building system.

Additionally, the invention in yet another embodiment provides a compilation of energy-relevant data, comprising: a stream of energy-related data for at least one individual energy user within a plurality of energy users (such as where the at least one individual energy user is within a multi-building system and separate streams of data are provided for other individual energy users within the multi-building system.)

The invention also provides a data analysis method, comprising leveraging a stream of energy-related data for at least one individual energy user within a plurality of energy users, wherein the leveraging includes a comparison against historic data for the device. The leveraging may include computer-based searching for rapid deviation from a historic pattern.

Another embodiment of the invention provides a method of determining whether to repair or replace an individual energy user, comprising: reviewing a stream of energy-related data for the individual energy user, wherein the individual energy user is contained within a plurality of energy users.

The invention in an additional embodiment provides an energy management system for automatically achieving energy curtailment in a multi-building system, comprising: immediate automatic querying of energy users within the building system for energy curtailment possibilities; automatic receipt of responses from queried energy users with energy curtailment possibilities; automatic processing of energy curtailment possibilities into a round-robin curtailment rotation.

Some perfecting details of the inventive systems, methods, etc. are mentioned as follows, without the invention being limited thereto.

Preferably, each energy user has associated therewith a dedicated neural network, such as a dedicated neural network that continuously learns operating characteristics of said energy user associated with the dedicated neural network, wherein forward and backward reasoning and forecastability are provided.

Where an adverse energy event or energy-relevant event is mentioned, examples may be a new peak demand or threat thereof; a human-given directive to curtail a certain amount of energy consumption; and/or an excess increase of energy price in a deregulated market. The adverse or energy-relevant energy event may be a surge or a steady increase towards a new peak demand; at least one recognizable pattern of data that has been learned via artificial intelligence by a computer system doing the monitoring; etc. Preferably, the computer doing the recognition of an adverse energy event, for each recognized pattern of data that is an adverse energy event, reacts with an automatic response based upon reasoning (such as a querying response to be executed).

Where monitoring is mentioned, the monitoring may occur in a context selected from a business-as-usual context; 24×7 permanent load reduction context; and an emergency context. Energy use may be constantly monitored and/or adjusted, said constant monitoring and/or adjustment being non-human, wherein business-as-usual constant adjustment, 24×7 load reduction is provided. The non-human constant monitoring and/or adjustment preferably is by artificial intelligence; and, preferably is to monitor and/or adjust at least one factor that influences energy consumption (such as current weather conditions at and/or approaching an energy-user; occupancy levels of a facility served by an energy-user; market price of energy; weather forecasts; market price forecasts; air quality; air quality forecasts; lighting quality; lighting quality forecasts; plug load patterns; plug load pattern forecasts; etc.).

The invention may include and/or provide one or more of the following:

at least one modeling agent and/or at least one forecasting agent;

24×7 permanent load reduction;

minimization of energy consumption in ongoing business-as-usual energy consumption;

load balancing between buildings;

automatic documentation of energy savings attributable to any automatic intervention(s) by the energy management system;

machine-based learning from the obtained data and/or machined-based constructing a model from the obtained data;

automatic documentation of energy savings attributable to any said automatic intervention(s);

machine-based reasoning to select between at least two conflicting goals (such as machine-based reasoning is to select between a market price goal and a comfort-maintenance goal);

a computerized display of energy data and/or device;

on human demand, computerized forecasting, computerized simulation of an effect or effects of a proposed control action, and/or computerized reporting on simulation at various levels of aggregation;

artificial intelligence reasoning based on one or more of: (A) knowledge about a building or buildings in the building system, (B) knowledge about an energy using device, (C) knowledge about the building system, and (D) data outside the building system;

automatic querying of energy users;

receiving responses from queried energy users and automatically processing the received responses;

automatic formulation of an optimal energy-saving command decision and/or strategy;

executing the optimal energy-saving command decision or strategy;

generation of a log of historical activity by one or more artificial intelligent agents performing the artificial intelligence reasoning;

machine-based detection of presence of a chemical or biological warfare agent, to which is determined a machine-based response (such as release of an anti-agent and/or adjustment of one or more energy users); at least one machine-based determination of at least one parameter of interest to a building manager, said parameter being measurable and controllable;

automatic monitoring of the computerized response;

communication over the Internet;

learning by artificial intelligence that a desired target parameter (such as room temperature) in each area served by the system can be maintained by a round-robin rotation;

compiling a complete array of historical data in computer-readable form, determining one or more patterns therefrom, and comparing therewith current real-time data to forecast if a new peak is going to be reached;

neural network based prediction;

one revenue-grade virtual meter which is an aggregation of revenue-grade meters;

monitoring and adjusting based on all of current weather conditions at and/or approaching an energy-user; occupancy levels of a facility served by an energy-user; market price of energy; weather forecasts; market price forecasts; air quality; air quality forecasts; lighting quality; lighting quality forecasts; plug load patterns; and plug load pattern forecasts;

preliminary functional testing for obtaining data and formulating applicable rules, and a continuous process of learning embedded in a neural net of a modeling agent associated with an energy-using device.

Where a building system is mentioned, the building system may be a single building or at least two buildings. The building or buildings may be, for example, at least one university building; at least one hotel building; at least one hospital building; at least one car dealership building; at least one shopping mall; at lease one government building; at least one chemical processing plant; at least one manufacturing facility; and any combination thereof of buildings.

When at least two buildings are provided, the at least two buildings under management may be geographically dispersed (such as a state's difference apart); and/or commonly owned or not commonly owned. Ownership may be, for example, by a commercial entity, a university, a government, etc.

Where a peak is mentioned, examples of a peak include a kW demand peak, a lighting peak, a carbon dioxide peak, a pollutant peak, etc.

Where an automatic response is mentioned, preferably the automatic response is non-determinative.

There has been mentioned automatic determination of whether at least one energy-relevant event is present, and preferably such automatic determination comprises application of artificial intelligence.

When artificial intelligence is mentioned, preferably the artificial intelligence is that of neural networks; rule-based expert systems; and/or goal-based planning systems. The artificial intelligence reasoning may comprise at least one artificial intelligent agent and, optionally, at any given time, what the artificial intelligence agent is doing may be monitored (such as monitoring by a human viewing what the artificial intelligence agent is doing).

One or more of the following may be provided and/or included: more obtained energy data is processed in a given time period than could be processed by a human being; a non-human, computerized response may be formulated after processing of more information than could be accomplished by a human in whatever processing time has been expended; monthly energy consumption may be reduced for the building system and/or peak load demand charges for the building system are lowered. Where computerized reporting has been mentioned, the aggregation level for the computerized reporting may be at an individual device, at everything in a building, at a set of buildings, or everything commonly owned. The optimal energy-saving command decision may comprise a rotation of energy curtailment that minimizes impact over energy users in the system.

Where a computerized response has been mentioned, the computerized response may include at least one determination based on one or more of: (A) air quality, humidity, pollutants, air flow speed, temperature, and other descriptors of physical properties of air; (B) light direction, light color, ambient temperature, foot candle, kw consumption of light producing equipment, smell of light, and other descriptors of physical properties of light; (C) plug load; motion sensed by motion sensors; carbon dioxide levels; brightness; sound levels; automated device for sensing human presence; motion detectors; light-sensing apparatus; habitation-sensor; (D) chemical or biological warfare agent sensing device (such as a mustard gas sensor, an anthrax sensor, a carbon monoxide sensor, a carbon dioxide sensor, a chlorine gas sensor, a nerve gas sensor, etc.).

Where a round-robin rotation system has been mentioned, examples may be a round-robin system formulated in response to a human request for energy curtailment; a round-robin system implemented under business-as-usual circumstances, etc. By way of example, a computer may automatically process the responses from queried users, total the respective curtailment possibilities from the queried energy users amounts, determine whether the total of respective curtailment possibilities is sufficiently large, and, (A) if so, proceed to schedule a round-robin energy curtailment rotation pursuant to criteria; and, (B) if not, notify a human user. The round-robin curtailment rotation may be executed and achieve energy consumption reduction. The energy consumption reduction may occur during an energy emergency (such as, e.g., an energy emergency declared by a local independent system operator, a power authority, a utility supplier, or a governmental authority, etc.). A round-robin curtailment rotation may be called in order that energy may be sold back into the grid.

Where computer-readable data has been mentioned, the computer-readable data may comprise data from the energy users in the building system; from a source selected from sensing devices, electric meters used for billing, and information from individual devices; etc.

Demand for each individual device may be forecast based on temperature forecasts; patterns historically observed and learned via artificial intelligence and under continual update; and occupancy where the individual device is provided.

Where immediate automatic querying has been mentioned, such querying may be directly or indirectly activated such as querying based on, for example, a request by a local independent system operator, a power authority or a utility supplier.

The invention provides optional documentation, such automatic documentation automatically generated of avoidance of a new energy peak, with said automatic documentation being (a) stored in an accessible computer file and/or (b) printed and/or stored in a human operator-friendly format.

The invention advantageously makes possible that, if desired, a human operator is not needed. If desired, a human operator may have an optional override right. Also optionally, a human operator may enter a query (such as a query as to current state of one or more devices in a specified building, a query requesting a prediction of effect of proposed control action(s) on an energy bill and/or on comfort, etc.). The invention includes an embodiment wherein no human operator intervention is involved in either the automatic processing to forecast whether or not a new energy peak is approaching nor the immediate, real-time, automatic response to the forecast that a new energy peak is approaching. By applying the invention, new energy peaks may be avoided without human operator intervention. Advantageous results (such as energy consumption reduction) mentioned herein may be achieved even when no human is controlling.

BRIEF DESCRIPTION OF THE DRAWINGS

FIG. 7 is a chart of an exemplary rotation schedule/matrix example according to the invention, with a load rotation "round robin" approach being shown.

DETAILED DESCRIPTION OF PREFERRED EMBODIMENTS

Figure 1:
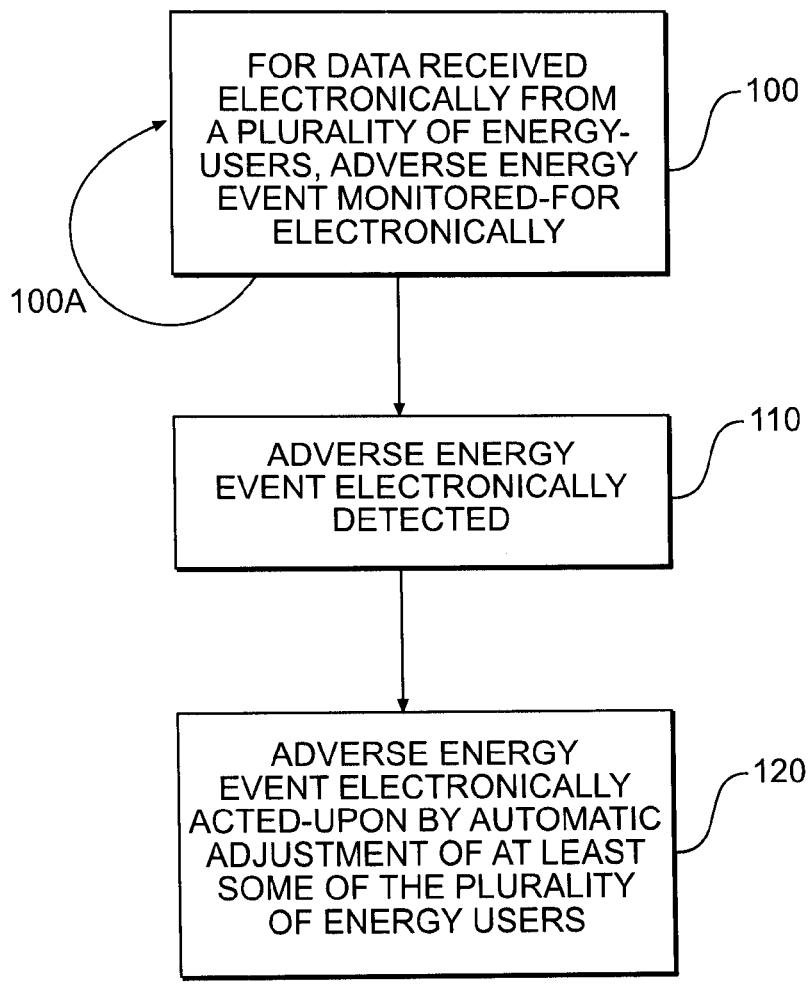
FIG. 1 is a flow chart of an exemplary inventive energy management system which is machine-based and may operate human-free.

As may be seen with reference to FIG. 1, in one preferred embodiment, the invention is a machine-based energy management system, which may be human-free in operation. Although a human operator is not needed, a human operator is not necessarily precluded from acting in the energy management system. In the energy management system of FIG. 1, for data received electronically from a plurality of energy users, an adverse energy event is monitored-for electronically (100). If the electronic monitoring 100 detects no adverse energy event, the electronic monitoring for an adverse energy event continues (100A) as more to-be-monitored data is electronically received. If the electronic monitoring 100 electronically detects an adverse energy event 110, the adverse energy event that has been electronically detected 110 is electronically acted-upon 120 by adjustment of at least some of the plurality of energy users. (Herein, reference is made, variously, to electronically-done steps, machine-based activity, computer functioning, electronic activity, automatic activity, and the like, in each case, to make clear that the step is performed in a non-human manner rather than to limit reference to a particular machine or device.)

The monitored-for adverse energy event may be any energy-usage and/or energy-cost related event, for which the received to-be-monitored data may be electronically monitored. As a preferred example of an adverse energy event for which the received energy data may be monitored is mentioned the surge towards a new energy peak. It will be recognized and appreciated that a machine, such as computer, may more rapidly calculate and compare numerical information than could a human operator. Presented with the same electronic energy data, a machine-based system can more rapidly and accurately arrive at a faster conclusion as to the direction being taken by the energy use in the entire system. The greater the number of energy users, the greater the number of buildings in the system, and the greater the dispersion of energy users over different buildings, the more difficult it is for a human operator or for several human operators to make decisions that minimize energy usage and cost of energy usage without adversely affecting operations and occupants.

The invention may be used in any system including a plurality of energy users, most preferably a system in which the plurality of energy users are dispersed in multiple commercial buildings. The invention provides particular advantage in a multi-commercial building system, because of the difficulties otherwise posed by energy management and energy cost control in such multi-commercial building systems. As examples of commercial buildings may be mentioned, e.g., university buildings, factories, hospitals, office buildings, etc. It will be appreciated that not necessarily all energy users in a building are required to participate in the energy management system of the invention.

As examples of an "energy user" in the present invention may be mentioned any device that requires energy to operate, including but not limited to, e.g., air conditioners, chillers, heating and ventilation, fans, fountain pumps, elevators, other equipment, lighting, etc.

As examples of the to-be-monitored energy data received electronically from the energy users are any data that are receivable from an energy user in real-time (i.e., embedded) communication with a data-receiving device. As examples of such data movement may be mentioned an electronic means of real-time data movement such as a network (such as the Internet (i.e., the World Wide Web (WWW), an intranet, etc.), most preferably, the Internet. As examples of the sources of the machine-readable data that is received and subjected to machine-based monitoring may be mentioned any metering device, measuring device, etc. that measures energy use (including actual use and scheduled upcoming use) of an energy user.

With reference to FIG. 1, the electronic-acting upon 120 a detected adverse energy event may be any response or adjustment that reduces energy cost and/or energy usage, most preferably an energy cost reduction and energy usage reduction approach with minimal impact on occupant comfort and normal operations. An exemplary electronic response 120 to a detected adverse energy event may be seen with respect to FIG. 2, in which the energy management system provides electronic receipt of data from a plurality of energy users (200). The received data is electronically processed (210) vis-à-vis whether an adverse energy event (such as approach of a new peak) may exist, and when an adverse energy event is detected, the system electronically requests energy curtailment possibilities (220) from some or all of the plurality of energy users. Energy curtailment possibilities from energy users are electronically received (230), and received energy curtailment possibilities are automatically processed (240).

In the electronic request for energy curtailment possibilities (220), it is not required that all energy users be queried for energy curtailment possibilities. For example, certain energy users that are deemed essential may be excluded from being part of an automatic query for energy curtailment possibilities. The requests for energy curtailment possibilities are directed to such energy users that have the ability to consider their energy curtailment possibilities and to formulate an energy curtailment response (such as an offer of kilowatt hours to forego). Thus, the energy users to be queried are supplied with such artificial intelligence, neural network technology, or other computer- or machine-based technology and programming such that they can compute, in real-time, what energy curtailment they can offer based on certain preset rules applicable to the respective energy user, such as rules relating to current weather conditions, comfort, etc. Thus, it will be appreciated that respective energy users will have programming suitable for the context in which the energy user operates. For example, an air conditioning energy user and a multi-elevator energy user will be programmed to consider different factors for evaluating whether each can use less energy. An air conditioning energy user may be programmed to consider outside temperature and time of day and other factors, while a multi-elevator energy user may consider time of day and not be programmed to consider outside temperature. The multi-elevator energy user may place much different emphasis on time-of-day than the air conditioning energy user. For example, because shutting down elevators at certain high-traffic times of day may achieve an energy savings but be unacceptable from a building management viewpoint, the elevator energy user's formulation of an energy curtailment possibility response may heavily depend on the time of day.

Each to-be-queried energy user thus is provided with a means to intelligently respond in real-time with an appropriate response that is minimally-invasive or bothersome to the building occupants and those being served by the queried energy user.

Figure 2:
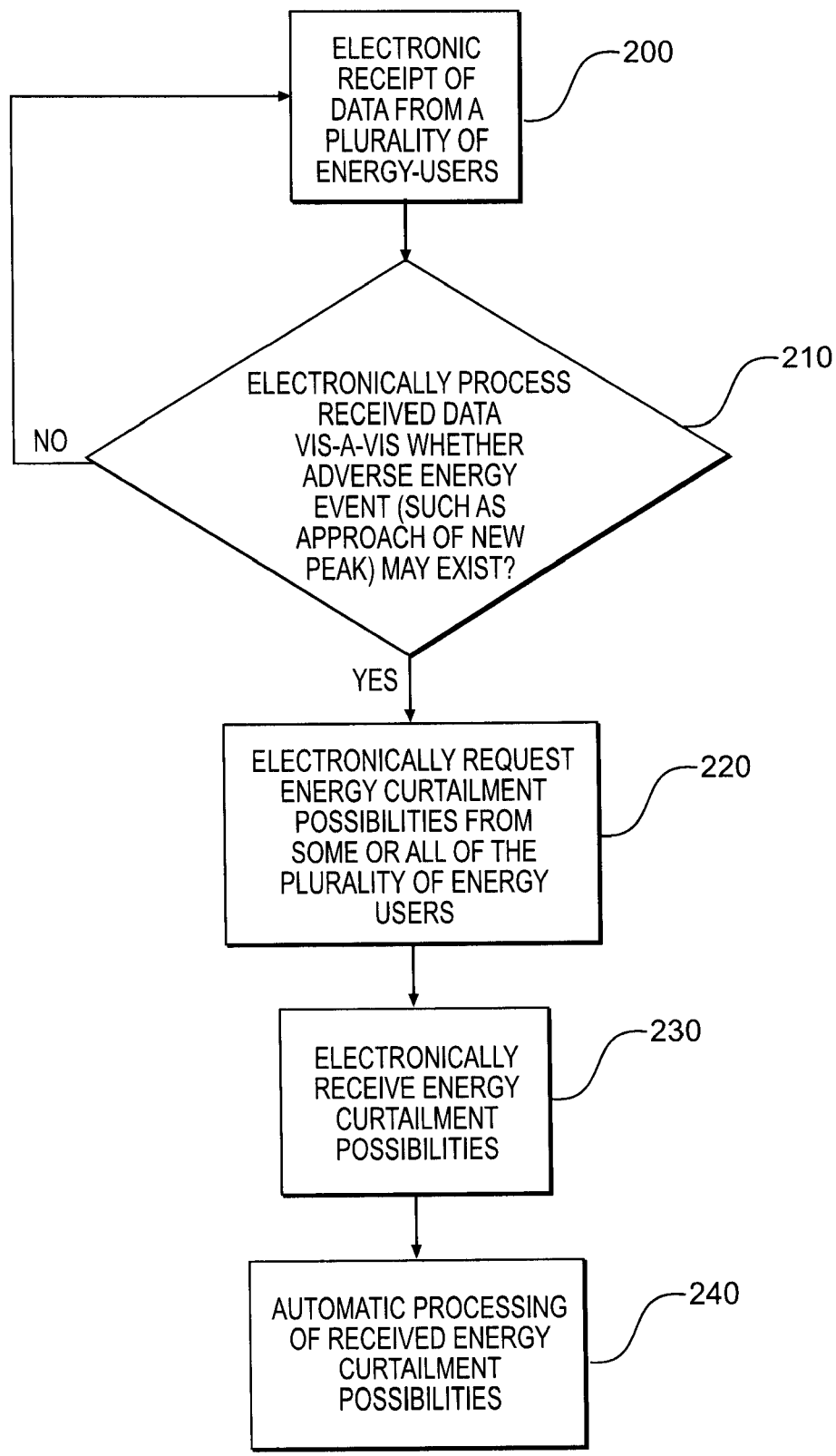
FIG. 2 is a flow chart of exemplary machine-based energy data receipt and processing, including automatically identifying and responding to an adverse energy event, according to the invention.

With reference to FIG. 2, it is particularly mentioned that the energy curtailment possibilities from the energy users are electronically received (230) and automatically processed (240). That is, reliance on a human operator advantageously is not needed.

Figure 3:
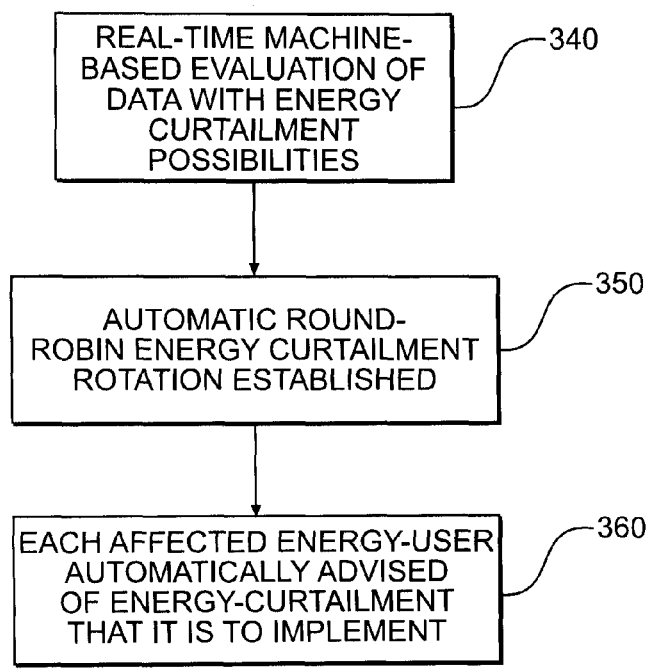
FIG. 3 is a flow chart of an exemplary machine-based energy curtailment response to an adverse energy event, according to the invention.

It will be appreciated that, in a preferred embodiment, the invention provides for the energy management system of FIG. 3, in which the system provides real-time machine-based evaluation of data for energy curtailment possibilities (340), from which an automatic round-robin energy curtailment rotation is established (350). Each affected energy user is automatically advised of the energy curtailment that the affected energy user is to implement (360) as its part in the round-robin energy curtailment rotation. It will be appreciated that a human operator or operators (especially in a multi-building system) cannot formulate an optimal round-robin energy curtailment rotation in the short time that a machine-based system can. Moreover, even once a machine-based energy curtailment round-robin rotation is established, it will be appreciated that it is much preferred for a machine-based system to electronically implement the established rotation, compared to human involvement in controlling the to-be-curtailed energy users. While human involvement in the inventive energy management system is not prohibited (such as the ability of a human operator to override or command that a certain feature of the established rotation not be implemented), preferably human operator involvement is limited or none.

Figure 4A:
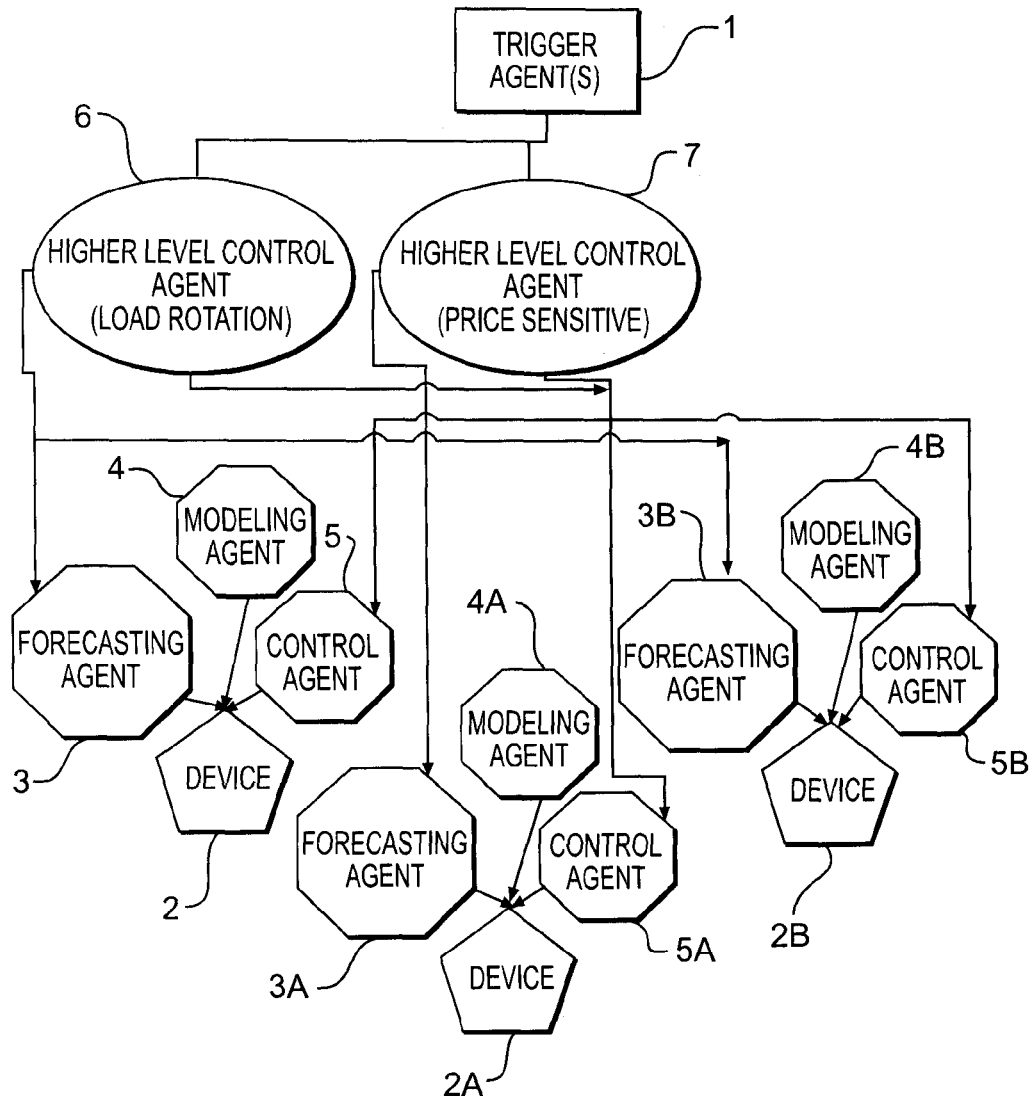
FIGS. 4A and 4B are examples of schematic diagrams of the relationship of user-set goals to be effectuated by higher level agents and the higher level agents, according to the invention.
Figure 4B:
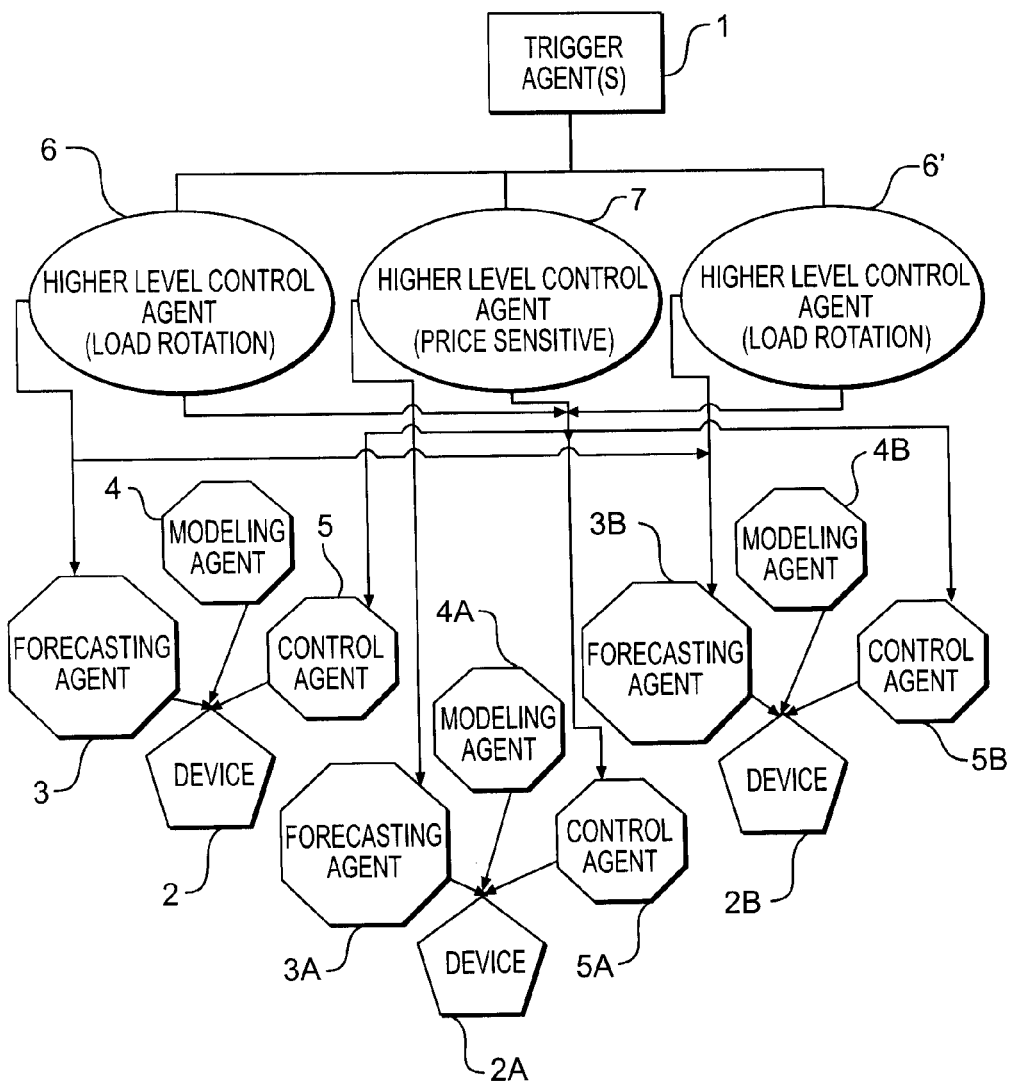

With reference to FIGS. 4A and 4B, the relationship of trigger agent(s) 1 (such as user-set goals or peak load) for higher level agents to accomplish, higher level agents that are to accomplish those user-set goals, and devices 2, 2A, 2B may be seen in two exemplary uses of the invention. As examples of trigger agent 1 when the trigger agent 1 comprises user-set goals for higher level agents to accomplish may be mentioned: impact on occupants expressed in computer-based terms; price sensitivity expressed in computer-based terms; etc.

Energy-using devices 2, 2A, 2B are shown, but more sets of devices may be incorporated into the system. In the case of the three sets of devices 2, 2A, 2B, three are shown for manageability of illustration, and not to indicate any limitation of the invention in that regard. The same comment applies to other features shown herein, such as buildings 10, 10A, 10B.

Device 2 is provided with a forecasting agent 3, a modeling agent 4 and a control agent 5.

Respectively, device 2A is provided with a forecasting agent 3A, a modeling agent 4A and a control agent 5A and device 2B is provided with a forecasting agent 3B, a modeling agent 4B and a control agent 5B. Preferably, each device (energy user) has a dedicated neural network that continuously learns the operating characteristics of that energy user, and allows forward and backward reasoning, thereby making forecasts. For example, the neural network may learn that if the temperature setting of an air conditioning unit is bumped by 2 degrees, that a certain drop in kW consumption results. The neural network may learn that if kW consumption is dropped by 3 kW, a certain temperature effect is observed. The neural network may learn that if a certain event or device setting adjustment occurs, the time elapsed before an OSHA level is reached is a certain amount. These are only a few examples of reasoning by the neural network.

As a modeling agent 4 may be used any system configurable as a neural network that may be disposed with respect to an energy user (device) to learn (preferably, to continuously learn). Examples of what may be learned about an associated device by a modeling agent include, e.g., energy consumption (kW), temperature, degradation time, fan speed, vane position, etc. A modeling agent preferably continually learns the operating characteristics of the device with which it is associated, thus understanding, for example, the connections between energy consumption (kW) and room temperature for an air conditioner. A forecasting agent predicts energy consumption of the device associated therewith under various conditions, allowing simulation and curtailment decision making. A device control agent takes control of the device.

As a forecasting agent 3 may be used any system that, upon receiving a question, returns to the modeling agent 4 and runs the question. Preferably, the forecasting agent 3 neither over- nor under-generalizes. For reducing over- and under-generalization by the forecasting agent 4, it is preferred for the modeling agent 4 to have been in continual learning for as long a time period as possible, with relatively longer times of continual learning being more preferable. For example, a modeling agent that has been in continual learning for a one-day period has only a certain limited number of data points and if a query is posed to the forecasting agent and the forecasting agent cannot find an exact match of data points in the modeling agent, the forecasting agent will need to generalize (i.e., extrapolate) and is relatively likely to over- or under-generalize. If the modeling agent has been in continual learning for a five-year period, if the same query is posed to the forecasting agent, the forecasting agent is relatively more likely to find a match, or at least a closer match, of data points in the modeling agent, and thus the forecasting agent is relatively less likely to over- or under-generalize.

Higher-level control agents run on the portfolio or building level, controlling many devices (via their control agents). Based on user-set goals and environmental input (such as price of energy, temperature, occupancy, etc.), the higher level agents devise a strategy to achieve the user-set goals and accomplish the user-set goals by controlling the device agents. Higher-level agents reason via artificial intelligence to find a suitable balance between two or more goals, such as between savings and comfort.

A higher level control agent (for load rotation) 6 is provided in FIGS. 4A and 4B. In FIG. 4B, a second higher level control agent (for load rotation) 6' also is provided, showing a situation where load rotation may have two different portfolios. An example of a context represented by FIG. 4B may be where different strategies are in place. Examples of a strategy include, e.g., a permanent 24×7 load rotation; a curtailment load rotation. A strategy or strategies is or are embodied by one or more artificial intelligent agents.

An artificial intelligent agent may be concerned with a strategy such as price sensitivity; air supply; temperature, etc. Intelligent agents can be used to reduce energy cost better than automated building management systems and/or human experts. Herein, examples are given showing how intelligent agents using continuous learning and reasoning can manage energy better than conventional building management systems. Both, the cost of energy for large buildings and the comfort for tenants are taken into account. The scenarios of the Examples herein highlight major differences between knowledge based energy management and conventional, schedule-driven energy management. From the Examples and Comparative Examples herein, it can be seen that continuous learning is more accurate than one-time settings; accurate forecasting enables smart planning; flexible responses to curtailment requests are provided; a wider range of information inputs means better building intelligence; rigid scheduling cannot accomplish the results of knowledge-based reasoning; feedback loops are too simplistic for today's sophisticated energy management concepts; trial and error methods are too costly Referring to FIGS. 4A and 4B, a higher level control agent 7 that is price sensitive is provided. Control agents 6, 6' (in FIG. 4B) and 7 are intelligent agents.

For connecting to buildings in which the devices 2, 2A, 2B are located, suitable hardware and software (such as platform hardware and software provided by Engage Networks and Silicon Energy) are used. A building equipped with a building management system (BMS) provides the easiest connection to the system comprising the intelligent agents (i.e., the higher-level control agents), as well as to individual energy-consuming devices 2, 2A, 2B. When BMS is used, as a platform may be mentioned any communications protocol that allows quick and seamless communication with the BMS and the devices it monitors. As a most preferred example may be mentioned BMS platforms with open communications protocols such as BacNet via UDP, which allow quick and seamless communication between the system comprising the intelligent agents with the BMS and the devices it monitors. If the BMS is not open (i.e., does not adhere to an open communications standard, such as BacNet or OPC), appropriate drivers may be obtained and used to communicate. For example, the BMS manufacturer may be contacted to buy or otherwise obtain the driver or at least the specifications for the driver to talk through the Internet to the BMS through them. Examples of such BMS drivers include, e.g., control drivers by Johnson, Invensys, Honeywell, etc. As software useable in the invention may be any software that allows communication with a BMS such that remote control can be achieved.

Advantageously, the present invention is installable in conjunction with certain existing equipment and software. For example, hardware devices may be installed that can translate between protocols and conduct simple data buffer or transfer tasks. Existing monitoring systems (such as those provided by Engage Networks and Silicon Energy) may be leveraged, for connecting portfolios of buildings. Such existing monitoring systems which allow end-users to manually control a BMS are lacking in any artificial intelligence capability, and that artificial intelligence capability is thus supplied by the present invention. The present invention, by operating in connection with an existing monitoring system, can connect to an installed, in-place customer base quickly, with minimal local installation.

Figure 5:
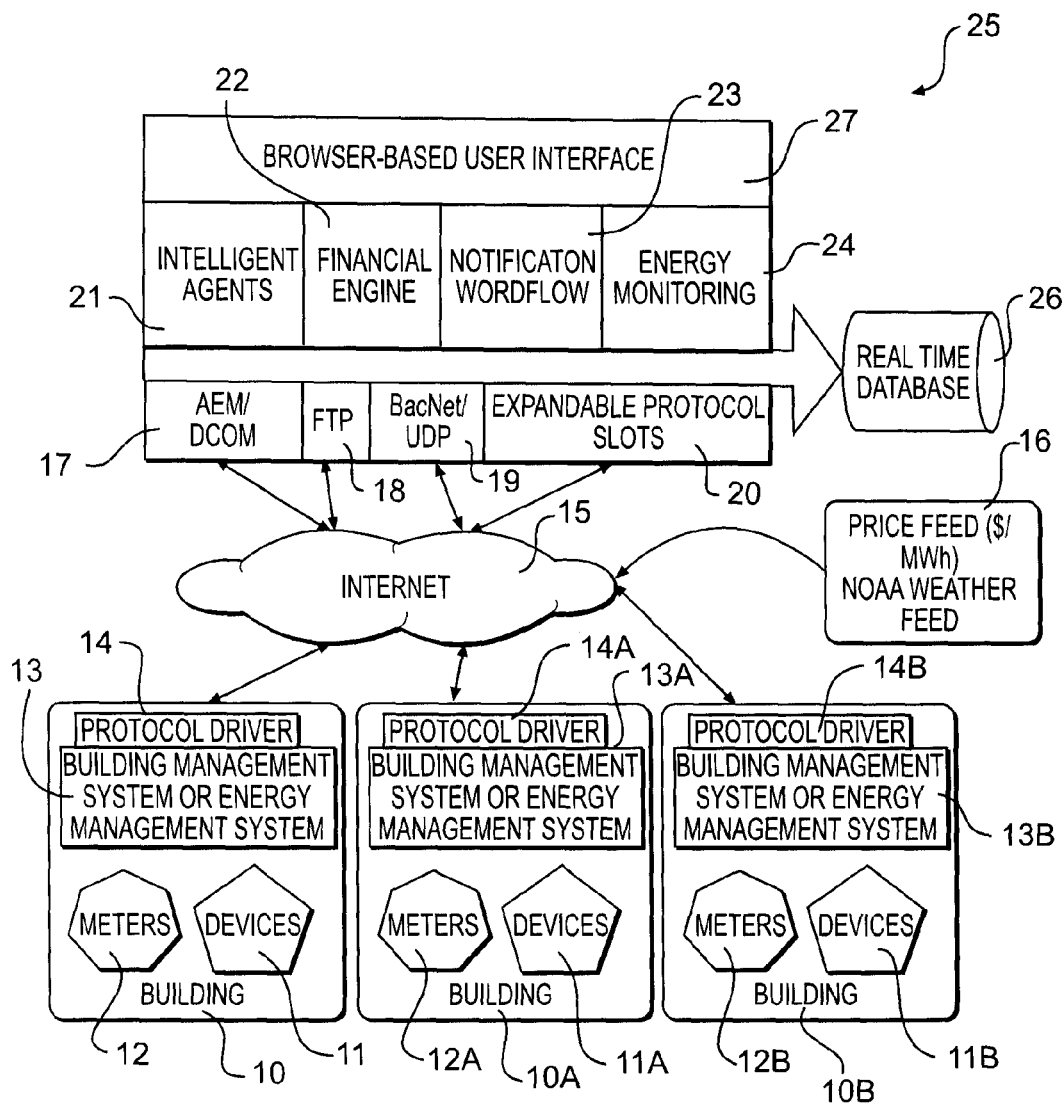
FIG. 5 is a diagram of an exemplary Internet-based energy management system of three buildings, according to the invention.

Referring to FIG. 5, an exemplary Internet-based energy management system of three buildings 10, 10A, 10B, according to the invention, may be seen. It will be appreciated that the invention may be used with more or less than three buildings. Each respective building 10, 10A, 10B has located on-site respective energy-using devices 11, 11A, 11B. A preferred embodiment is discussed in which a building such as building 10 has multiple energy-using devices 11.

Each respective building 10, 10A, 10B has associated therewith respective meters 12, 12A, 12B. A preferred embodiment is discussed in which a building such as building 10 has multiple meters 12, but it is possible for a building to have only one meter. As a meter may mentioned any metering device that measures energy-relevant information, such as air temperature, air quality, humidity, etc. Meters 12, 12A, 12B and devices 11, 11A, 11B are connected through a building management system or energy management system (such as an existing building management system) and a network 15 (such as the Internet) to at least one intelligent agent, most preferably to a system including intelligent agents. Each respective building 10, 10A, 10B has associated therewith a respective building management system or energy management system 13, 13A, 13B (such as a conventional building management system, a conventional energy management system, etc.). In FIG. 5, a three layered architecture (user interface, business logic, and data layer) is shown.

Each respective building 10, 10A, 10B has associated therewith a respective protocol driver 14, 14A, 14B. Each respective protocol driver 14, 14A, 14B is in communication with a network 15 (such as the Internet). The network 15, in addition to receiving data from protocol drivers 14, 14A, 14B, also receives other energy-relevant data 16 (such as a price feed (in $/MWh) and/or a NOAA weather feed, etc.).

In this example, the network 15 (such as the Internet) further is in communication with a communication layer (such as a communication layer comprising AEMIDCOM (or other Engage Data Server driven by Active Server Page Technology through the firewall generating HTML pages) 17, FTP (File Transfer Protocol) 18, BacNet/UDP 19, and expandable protocol slots 20). BacNet/UDP is an open standard, an example of an open building intercommunications protocol, put forward by the BacNet consortium. BacNet via UDP takes that protocol and transports it in datagrams (UDP) over the Internet. The UDP is the envelope; the BacNet message is the content. A communication layer other than a communication layer comprising AEM/DCOM 17, FTP 18, BacNet/UDP 19, and expandable protocol slots 20 may be used in the invention. It will be appreciated that AEM/DCOM, FTP, BacNET/UDP and expandable protocol slots are shown as examples and their use is not required, with communications tools being useable in the invention.

AEM/DCOM 17, FTP 18, BacNet/UDP 19, and expandable protocol slots 20 are included in data processing system or computer system 25. Data processing or computer system 25 thus is able provide a real-time database 26. The real-time database 26 advantageously includes real-time energy-relevant information specific to the buildings 10, 10A, 10B as well as real-time energy-relevant information "from the world," i.e., the energy-relevant information 16 (such as price feed in $/MWH and NOAA weather feed).

Data processing or computer system 25 further includes intelligent agents 21, optional but particularly preferred financial engine 22, optional but particularly preferred notification workflow system 23 and optional but particularly preferred energy monitoring system 24, which receive, process and/or act on information communicated via the network 15 (such as the Internet). Advantageously, real-time receipt is made possible, as well as real-time processing and/or acting on received information. The intelligent agents 21 are the heart of the intelligent use of energy system of FIG. 5. The intelligent agents 21 preferably function in neural networks, which monitor each piece of equipment, forming a non-parametric model of its behavior, allowing accurate predictions of the impact that specific energy control actions will have on the building environment. Also, energy savings predictions can be accomplished based on environmental changes (temperature, air-quality, etc.). These "device agents" are used by higher-level agents to pursue a number of strategies, such as "minimum disturbance load rotation" or "supply air reset". These intelligent agents function like highly specialized, 24×7 staff members, and can be switched on or off, or given different goals to accomplish. The intelligent agents 21 monitor and control the devices to maximize energy savings, while minimizing impact on environmental quality.

The data processing or computer system 25 thus monitors and processes the real-time database 26, based on rules and/or parameters, and formulates real-time queries (such as queries for energy curtailment possibilities from energy-using devices 11 within building 10) and/or commands (such as an energy curtailment round-robin rotation to be imposed on devices 11, 11A, 11B). The real-time queries and/or commands formulated by the data processing or computer system 25 are communicated in real-time via the network 15 (such as the Internet) to the respective protocol drivers 14, 14A, 14B which leads to devices 11, 11A, 11B being controlled in an overall energy use reducing manner but with minimized discomfort or inconvenience to occupants or users of buildings 10, 10A, 10B. Discomfort or inconvenience to occupants or users of buildings 10, 10A, 10B is considered and included in the data processing or computer system 25 so that a particular energy-using device in the plurality of devices 11, 11A, 11B will not be curtailed in its energy use in a manner that would cause discomfort or negative impact. Thus, certain energy-using devices (such as computer equipment, hospital equipment, etc.) are treated differentially and intelligently so as not to be subjected to energy curtailment in the same manner as other energy-using devices, while other energy-using devices that are otherwise identical but in different buildings may be subjected to different energy curtailment based on time of day and occupancy or the like in the respective buildings. Thus, if building 10 and building 10A are in different time zones but otherwise have a similar set of respective devices 11, 11A, they may be controlled appropriately and in a maximally energy-intelligent manner.

It will be appreciated that the data processing or computer system 25 depends on rules and/or expressions and/or logic which are expressed in terms of variables and/or input which are manipulable and evaluable. For example, there may be used rules, expressions, variables and/or input suitable for aggregating energy use for the entire system of buildings 10, 10A, 10B and monitoring whether movement towards a new energy peak is occurring.

Thus, it will be appreciated that, in operation, the computer or data processing system 25 with the real-time database 26, the network 15 (such as the Internet) and the buildings 10, 10A, 10B essentially run themselves without necessity of a human operator. It will be appreciated that the computer or data processing system 25 can be far more effective at computational operations than can a human operator, and also can process the available data and real-time information, using the rules, far more quickly and accurately than a human operator could in the same amount of time. Thus, the invention advantageously provides machine-based operations in areas where reliance on human operators conventionally meant responses that now can be seen as relatively slow, inadequate or non-optimal.

Artificial intelligence and neural network technology are used so that a controller for an energy using device such as protocol driver 14, for example, may have a basis for responding to a query for energy curtailment possibilities. A set of rules is put into place for the protocol driver 14 and any energy-using devices 11 associated therewith. The set of rules is any set of rules appropriate to the energy-using device, the building in which the energy-using device is situated, and the building occupants or those served by the building. For example, the set of rules may take into account outside temperature, inside temperature, etc. and based on the differential therebetween may characterize the comfort level, with certain differential ranges being assigned to certain comfort level characterizations. While the set of rules is fixed in operation, the set of rules may be subjected to overhaul and change, such as if it is decided that a colder or warmer temperature range is now to be considered acceptable than in the past. While in a preferred embodiment the variables and rules operate so as to minimize any need or desire for human operator intervention, optionally, a manual human operator override may be provided, in which a human operator would be permitted to override computer-based control of one or more energy-using devices.

Referring to FIG. 5, it will be appreciated that the invention as discussed above advantageously permits systems of buildings 10, 10A, 10B to "run themselves" without the necessity of intervention of a human operator (on-site of buildings 10, 10A, 10B or elsewhere such as at a monitoring facility). A human operator is not needed for making energy curtailment and energy use decisions and optimizing energy use in real-time.

For the intelligent use of energy system of FIG. 5, buildings 10, 10A, 10B and users (such as building managers, energy managers, financial managers, etc.) are connected over a network 15 (such as the Internet). The intelligent use of energy system may include modules dedicated to meeting respective needs of users with different responsibilities and concerns, such as a financial engine module, a notification workflow module, an energy monitoring module, etc.

Moreover, valuable information is provided that building managers, financial managers and/or energy managers may observe how the computer-based system is performing, via browser-based user interface 27. For example, in a preferred embodiment, users access the intelligent use of energy system through a web-browner that connects to an ASP hosting site of intelligent use of energy software, which in turn, connects through the Internet, either directly or indirectly, to the buildings 10, 10A, 10B managed by the system. To accommodate the diversity of building management systems and associated protocols that are commercially in use, there may be used a communications module, preferably one that is an expandable communications bus architecture that can easily accommodate new communication protocols as plug-ins; also, preferably the communications module is one that can communicate with existing bidding management systems, "monitoring" systems and associated protocols currently available in the marketplace as well as able to communicate with new systems being developed and developed in the future. A particularly preferred communications module to use is IUE-Comm, developed by the present applicant Building managers, financial managers, energy managers, and/or others via browser-based user interface 27 may view information that would be of interest to them. For example, a building manager may use the system of FIG. 5 to monitor the current state of devices 11, 11A, 11B in the buildings 10, 10A, 10B. Building managers can see the temperature setting of air-conditioners, the consumption of chillers, the speed of fans, etc. The building managers can also optionally simulate one or more "what if" scenarios, using the intelligent agents, to predict the effect of control actions on the energy bill and the comfort in the building. Building managers optionally may manipulate the parameters of the intelligent agents, such as by constraining the temperature band used by a "supply air rest" agent. The building manager no longer needs to control individual devices (as he would conventionally do) because the intelligent use of energy system of FIG. 5 is "goal based". The manager gives the system a goal (such as to save 40 KW in the next two hours) and the intelligent use of energy system of FIG. 5 determines how to best achieve the goal. A building manager can rely on and use the intelligent agents like highly specialized, 24×7 staff members, switching them on or off, or giving them different goals to accomplish.

The energy manager refers to a human responsible for the optimal use of energy across facilities, such as across buildings 10, 10A, 10B. Issuing curtailment requests, for instance, is one of the major tasks of an energy manager. Using the system of FIG. 5, issuance of a curtailment request optionally can be accomplished manually, or automatically by pre-instructing the intelligent agents.

The financial manager is a human. In a preferred embodiment of the invention, the financial manager generally is interested in showing the savings that have been produced by using an intelligent use of energy system such as that according to FIG. 5. Finance modules in the system draw on a data warehouse that is created based on the system's real-time data base, and support the financial manager in analyzing energy consumption, identifying peak demands, pin-pointing inefficient equipment or operations, and demonstrating the overall effect of the agents saving energy costs. While such mentioned finance-related activities may not be necessary, they are particularly preferred for using the invention in a commercial context.

The real-time database 26 will be understood as a database continuously changing to reflect current data. The data in the real-time database 26 preferably is saved in a data warehouse (not depicted on FIG. 5), and from the data warehouse is usable such as for energy analysis and financial reporting.

Figure 6:
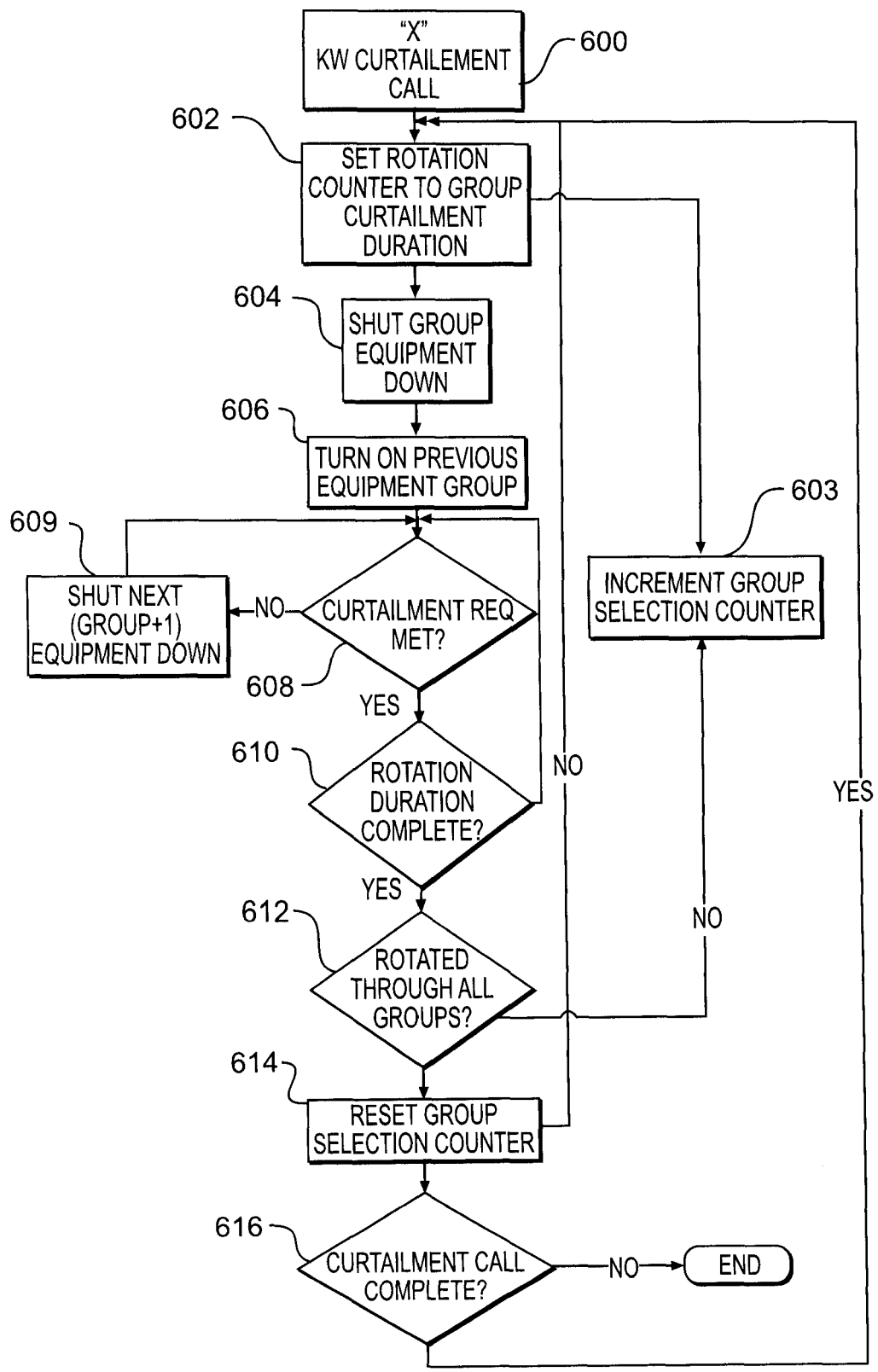
FIG. 6 is flow chart for an exemplary round robin algorithm for load rotation, according to the invention.
Figure 8:
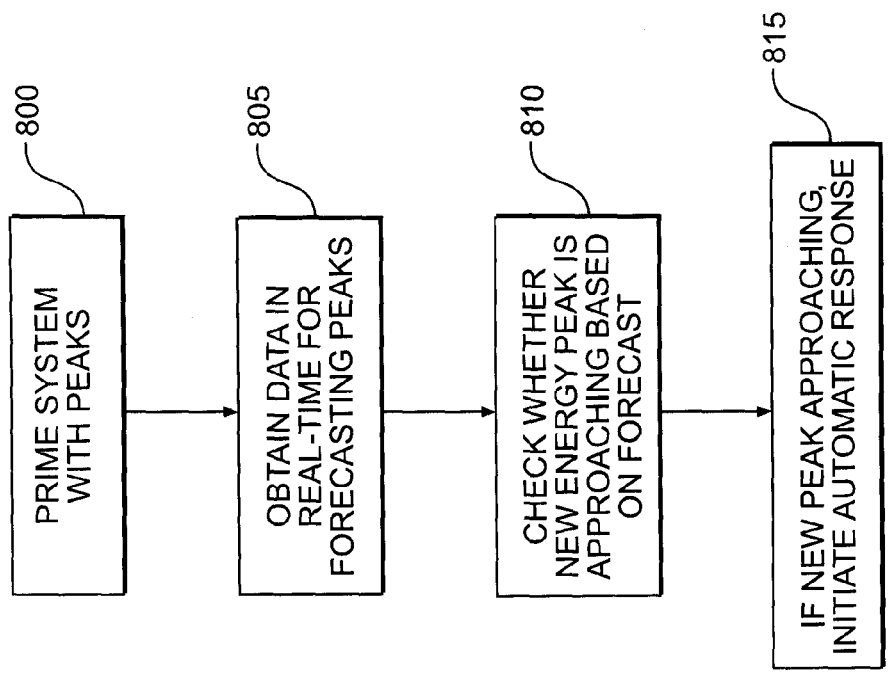
FIG. 8 is a flow chart of an example of an automated response to forecasted peaks.

A particularly preferred example of an energy curtailment regiment that may be automatically devised and implemented according to the invention is a round robin load rotation. The flow chart of FIG. 6 shows a preferred round robin algorithm for load rotation. For simplicity, not all checks (e.g., equipment status, manual override, etc.) that may preferably be performed are shown on FIG. 6. In FIG. 6, the round robin algorithm begins with a curtailment call 600 for a specific amount "X" KW (such as 30 KW). In response to the curtailment call 600, the rotation counter is set 602 to group curtailment duration, from which the system increments group selection counter 603. Also, based on the rotation counter being set 602, the system shuts group equipment down 604. After group equipment shut down 604, the system turns on previous equipment group 606. The system then asks 608 whether the curtailment requirement has been met, and if not, shuts the next (group+1) equipment down 609, and loops to re-ask 608 whether the curtailment requirement has been met. The loop continues until the question 608 of whether the curtailment requirement has been met is answered affirmatively, and then the system asks 610 if the rotation duration is complete; if not complete, the loop to the question 608 of whether the curtailment requirement has been met continues. When the question whether the rotation duration is complete 610 can be answered affirmatively, the system then asks 612 whether all groups have been rotated through. If all groups have not been rotated through, return is provided to incrementing group selection counter 603.

When the question 612 whether all groups have been rotated through is answered affirmatively, the system next resets group selection counter 614, and asks 616 whether the curtailment call is complete. If the curtailment call is not complete, i.e., if not enough energy curtailment can be achieved, the algorithm ends (END) on FIG. 6.

The invention has many practical and industrial uses. For example, the invention advantageously combines the power of artificial intelligence with the Internet to enable energy-using customers (such as building systems) to dramatically cut building energy costs in real time. Customers are able to do so by reducing the energy they consume each month, lowering their "peak load" demand charges, and by aggregating multiple electric meters into one "virtual meter." Also, the neural network and artificial intelligence used in the invention permit many factors that influence consumption (such as current weather conditions, occupancy levels and market price of energy) to be taken into account, as the system constantly monitors and adjusts energy use.

It is calculated that certain installations using the invention are expected to be able to reduce energy costs by more than 15% when all major energy-consuming devices are connected and full control over device settings is given to a software system according to the invention.

In another embodiment, the invention also provides for quantification of economic and energy savings, and for revenue generation. Particularly, the "curtailable" capacity and energy that may be generated from using the invention may be sold to regional control authorities and/or energy service providers.

The invention takes energy management to a new level, by applying the power of artificial intelligence, and by drastically reducing or removing the human element altogether (except when building managers choose to over-ride the system). Neural network and intelligence agent technology is used to monitor, analyze and adjust energy consumption in real-time. A number of factors, including energy prices, current and forecasted weather conditions, current and scheduled occupancy levels, space air temperature and space air quality, etc., may be taken into consideration. These factors are applied to the selection of strategies for reducing energy consumption at any given moment. The inventive energy management system is much more "intelligent" on a real-time basis than a human operator, who could not possibly analyze all of the constantly-changing factors affecting energy consumption and make adjustments quickly. Furthermore, the system provides a wealth of new data to building owners and managers, who can then make informed decisions for further energy reductions and future equipment purchase decisions.

The invention thus may be used to provide one or more of the following advantages: permanent load reduction; peak load avoidance; aggregation of multiple meters under a single "virtual meter"; automated curtailment response to Independent System Operator (ISO)/supplier requests; extensive baseline analysis, reporting and financial control; real-time reading of meters and devices; meter equipment trending; alarming; reporting; intelligent use of energy financing. These advantages and uses of the invention are discussed as follows.

As for permanent load reduction, it will be appreciated that the invention permits customers (such as industrial, commercial, university, hospital and other customers) to reduce their energy consumption on an ongoing basis by making thousands of minor adjustments hour-by-hour, twenty-four hours a day, to every piece of equipment attached to the system. When hundreds of energy-consuming devices such as air handlers, chillers and lighting systems are covered by the system, minor adjustments to each one can have a significant impact on overall energy consumption. For example, the system can meet energy reduction goals by raising the temperature in unoccupied rooms from 70 degrees to 75 degrees. Or, in response to an unusually cool summer day, the system might decide that starting the air conditioning before employees arrive for work would not be necessary or economic. Over the course of a month or a year, these minor adjustments add up to significant reductions in energy consumption and costs, without any discernable impact on operations or people.

Peak load avoidance is also advantageously provided by the invention. The energy bills for commercial customers consist of two parts—the cost of total energy consumption for the month, and a charge for the "peak" energy consumed during that month. This "peak load" charge can account for as much as 50% of the electric bill. The invention provides for intelligent use of energy, by applying artificial intelligence to achieve on-going peak load reduction guidelines, pre-set by the customer. In a typical situation, the customer would want to insure that peak loads will not exceed a previously set maximum or, more aggressively, might decide to reduce peak loads each month (such as by 10%). At any point in the month when peak loads approach the preset threshold, the intelligent agents in the invention can choose from a wide variety of available strategies to prevent crossing the line, such as raising (or lowering) thermostats throughout a building(s); dimming lights; etc. However, if executing a certain strategy would violate another parameter or other parameters set by the customer (e.g., that temperature must never go beyond a certain threshold or that lights cannot be dimmed below defined lumens, etc.), then the intelligent agents of the invention will either employ another strategy for reducing peak load demand, or notify the customer that the goal cannot be achieved. All of this analysis, action and/or notification occurs within minutes, and permits customers (including commercial customers in multi-building systems) to truly control their peak load charges.

The ability to produce a virtual meter or virtual meters is another advantage of the invention. Many commercial energy consumers receive a bill for every meter in their building or portfolio of buildings. It is not unusual for a single building to have multiple electric meters, and major office complexes or building portfolios in a given area may have many meters. Beyond the inefficiency inherent in receiving and paying numerous electric bills each month, electricity consumers are also charged for multiple, separate peak loads. The total of these peak load charges can be significantly greater than the actual peak that a single consumer reached at a particular point in a given month. Intelligent use of energy according to the present invention can resolve this problem by aggregating all of a customer's meters into one "virtual meter." This virtual meter can encompass hundreds of meters in dozens of buildings within a single Electricity (Energy) Pool. (The United States is divided into ten Pools which have very different tariff structures and regulations. As a result, a virtual meter cannot aggregate meters in different pools, under the present framework in the United States.) Customers could receive one bill, not hundreds, and the peak load charge would be calculated against the combined meters, not against each individual meter. This can lead to significant savings.

Another advantage of the invention is the provision of automated curtailment. Solving the long-term energy problem in the United States (and elsewhere) will require a multi-dimensional approach. New construction of energy plants and transmission facilities alone will not solve the problem, particularly in the short term where California and other areas face the potential for a California-size crisis. The present invention can play a significant role in mitigating energy shortages, and over the long term, substantially reduce the need for and cost of additional energy infrastructure. Under the terms of many commercial contracts, energy suppliers can ask customers to reduce consumption an agreed-upon number of times each year. During the electricity crisis in California in the spring of 2001, these provisions were invoked a number of times. To encourage commercial consumers to reduce consumption, and thereby avoid a crisis like that in California, many energy suppliers offered incentives to users to voluntarily curtail power during peak load events, such as unusually hot summer days. These incentives can include significant reservation charges for agreeing to be curtailed, discounts on tariffs, or even payments to companies that "sell back" unused power or capacity when requested to do so. In many instances, building managers used conventional energy management systems to manually or non-analytically turn off equipment in response to requests to cut consumption. In many cases, this led to the shutdown of businesses for hours or days, as happened in California. The invention can prevent this undesirable business shutdown situation, by automatically curtailing equipment in response to a request by the energy supplier, and can do so in a manner that minimizes disruptions. The intelligent agents of the invention, for example, may be able to achieve the curtailment by slight adjustments in equipment, or by selectively shutting down non-essential devices first. Or, the system in the invention may be set to shut down only non-essential buildings. The invention provides the ability to take into account many factors before taking action, and to do so within mere minutes of a request to curtail consumption, something otherwise beyond the capability of any human operator or business manager or conventional energy management.

The invention also provides advantageous analyses, reporting and financial control. When a customer initially determines to proceed with start-up of an inventive computer-based energy management system according to the invention, the customer's data may be entered in the computer-based system and provide the baseline for future analysis of the customer's energy consumption. Thus the impact of the computer-based system on the customer's energy consumption may be seen. Once a computer-based energy management system according to the invention is fully operational, a customer is able to monitor and analyze its energy consumption in real-time. Optionally a customer may customize an energy management system so that that it provides information in a manner and format suited to the customer needs. A customer can monitor and analyze the customer's energy consumption at a given moment or over any specified period of time.

Another use and advantage of the invention is regarding real-time reading of meters and devices. The energy consumption of every meter and device connected to the system may be monitored and evaluated, if desired. Equipment that is not performing at peak efficiency can be repaired or replaced, further lowering the overall energy costs. The invention thus provides a data stream relating to individual efficiency of energy-using equipment.

The invention also is useful in meter equipment trending, including permitting energy-using customers to undertake trend analysis on a meter-by-meter basis in real time. Building managers can access screens at any time that show the current usage trend on a given meter, and provide a forecast for future consumption if the trend does not change.

The invention further provides for alarming, including appropriate notification when any situation occurs outside specified parameters. For example, if a peak load threshold is about to be exceeded, the system provides notification immediately so that remedial action can be taken. However, the system also provides notification for less critical problems, such as malfunction of a particular piece of equipment, or sudden changes in energy consumption patterns.

In the invention, reporting may be provided. A full suite of reports may be provided, which can be accessed at any time or on a regular basis. These reports may include billing rates and differential billing, load shaping and profiling, and virtually any other report that a client may specify.

In the present invention, advantages related to finance also may be provided. Conventionally, the bill that an average commercial customer receives from its energy provider is immensely complex and frequently incorrect. By using the invention, the customer may compare actual real time data collected against detailed baseline data and against rate and tariff structures that apply to the customer's energy consumption. Such a comparison will show a customer the level of savings and revenue achieved and help the customer to ascertain whether or not the bill provided by the energy provider is correct.

Thus, the present invention provides the mentioned advantages, with a rapidity of evaluation and of execution, accuracy, and precision well beyond that possible by a human operator or team of human operators. Also, advantageously, the energy management systems of the present invention are intelligent and "learn," i.e., the systems learn from prior experience to improve results over time.

EXAMPLE 1

Initial deployment of energy load reduction according to the invention is accomplished by a fixed rotation schedule of equipment that is stepped through in a serial fashion. System attributes, such as allowable curtailment duration and electrical demand, is determined through functional testing and pre-programmed in a fixed matrix. A rotation script is then deployed to systematically cycle each piece (or group) of equipment off and on at a fixed duration. This 'round robin' rotation approach offers a less-than-fully-optimized rotation cycle but the system responses obtained from this method is used for training of the programmable intelligent agent (PIA) for optimal load rotation.

Ultimately, a programmable intelligent agent optimizes the load rotation of curtailable loads, using a combination of intelligent agents which operate the device level, portfolio level, and pool level as follows:
1) Device Level Programmable Intelligent Agent—utilizes a forward artificial neural network (FANN) to predict the load rotation period for equipment (device level 1A).
2) Portfolio Level Programmable Intelligent Agent—optimizes resource leveling based on the predicted load rotation periods derived in the device level PIA. Initially the portfolio is defined as the building revenue meter.
3) Pool Level Intelligent Agent—optimizes the load rotation using pre-conditioning strategies based on the timing of the market order.

Once the PIA algorithms are trained, the 'round robin' algorithm is withdrawn and the Intelligent Agent takes over schedule load rotation.

The system to which this example is applied is as follows. The equipment targeted for load rotation includes: electrical space heat, air conditioning compressors, fan motors, package unitary HVAC equipment, and process motors.

The Intelligent Agent interface requirements include:
1) Internet enabled on/off control. Curtailable loads are grouped into "banks" of equivalent electrical demand. Multiple matrices with alternative demand sizes may be deployed.
2) Optional Internet enabled monitoring of process limit(s) (required for resource leveling IAs). Where group on/off control is used, an average process measurement is to be provided, for example, the average space temperature or common return air temperature. If process limit monitoring is not deployed, then an acceptable period of the rotation schedule is determined through functional testing of process drift.
3) Optional Internet enabled control of process setpoint (required for preconditioning strategies IAs). If process setpoint is not deployed, then preconditioning strategies cannot be implemented.
4) Internet enabled monitoring of energy consumption through any of the following methods:
   a) Kw meter located either at the equipment level or in the electrical service to the electric heaters.
   b) Virtual Kw meter based on field verified rated kW and equipment on/off status. Calculation of virtual Kw can reside either within the customer's Building Control System or at an Application Server.

A Rotation Schedule/Matrix example is shown in FIG. 7, of a round robin approach to load rotation. The rotation matrix in FIG. 6 provides an example grouping for a 30 KW curtailment rotation schedule. Curtailable demand is determined by continuous measurement using the Internet enabled kW meter.

A brief description of each data entry is as follows. Data fields in bold italic are temporary values which are updated once the PIAs for Load Duration and Resource Leveling Optimization are deployed.

Rotation Group—Numerical group assignment for the purpose of prioritization and counting. The rotation groups are fixed during the initial deployment. The Load Rotation IAs optimize groups into equal load/equal duration.

Equipment ID—Alphanumeric equipment descriptor.

Controlled Device ID—Alphanumeric description of energy device.

Manual/Auto Indicator Address—The address of the Manual/Auto Status. (The term "address" is used to refer to the location assigned by the enabling platform (e.g., Silicon Energy "PtID", Engagenet, etc.) to be written to or read from.) Reading this point gives a "digital state" (0 or 1) indication the equipment has been placed in local override and is therefore not accessible for curtailment. If equipment status is unavailable, then the application "remembers" the outcome from the remote control event. For example, if equipment did not change kW during prior remote control event, then digital state is set to off. ("0").

Equipment Status Address—(Optional) A read only point that indicates the operational status (state output) of a piece of equipment. Operational status includes: normal, alarm, alarm code.

Curtailable Demand Setpoint—The curtailable electrical demand (kW). The setpoint for resettable devices is derived by means of direct measurement and approved by customer. For on/off devices, the curtailable demand setpoint is equal to zero.

Curtailable Demand—Curtailable demand initially is fixed, derived by means of direct measurement and review of normal kW process range. Once the Load Rotation IAs are enabled, the curtailable electrical demand is calculated as:

$$\text{Electrical Meter(prior time interval)} - \text{Curtailable Demand Setpoint.}$$

The calculated curtailable Demand is used within the Load Rotation IAs to optimize groups into equal load/equal intervals.

On/Off Control Address—The primary control address to which curtailment on/off commands are written. The command is as detailed in the on/off Control Command entry.

On/Off Control Command—The command signal to be written to the primary control address to place the equipment into curtailment mode. In most cases, this is a digital state command (0 or 1). The complement of the state command is used to disable curtailment. In those cases that require two cases, this typically is the "Internet control override" signal.

Reset Control Address—The (optional) secondary address to which curtailment commands are written.

Reset Control Command—The (optional) secondary command required to place a piece of equipment into curtailment mode. In most cases this is an analog reset variable (%, mA, V), for example, a reduced speed input into a variable speed drive. This input need not be reset to disable the curtailment mode, and is ignored when Control Command 1 indicates disablement.

Minimum Equipment Off Time—The minimum duration in which a piece of equipment may be sent into curtailment mode. Required to prevent short-cycling of equipment.

Maximum Curtailment Duration—The maximum duration a piece of equipment may be sent into curtailment mode. This period is initially determined through testing and is typically the worse case time interval before a process limit (space temperature, $CO_2$, etc.) served by the equipment falls out of range. Once the Device Level IAs are trained, the maximum duration will be fed into the Load Rotation IA for sorting into load groups.

Settling Duration—The time delay in which two equipment groups are required to overlap in curtailment mode (both groups in curtailment mode) before the prior group is brought out of curtailment mode. This is used to accommodate an overshoot electrical demand as the prior group's equipment is brought back to non-curtailment mode. Initially the settling duration will be fixed. Once the FANN IAs are trained, the settling duration will be fed into the Load Rotation IA for determining the group overlap.

Revenue Meter Address—The address of the utility meter serving the equipment to be placed in curtailment mode. The net desired kW curtailment must be seen at the meters or additional groups must be rotated into curtailment mode. Reasons for shortfalls in curtailment may include equipment off or in local override mode, or other equipment brought online during the previous group rotation. A range is established for the need for additional curtailment.

Process Variable 1 Address—The address of the first process variable to be used to constrain the magnitude and duration of the curtailment. For example, an AHU load rotation may be constrained by space temperature. This is typically be a zone temperature for AHU type curtailment. This information may not be required for the simplest form of the Round Robin approach. Up to three process variables are available for use; while not required, at least preferably one is be used (example for no process variables: fountain pumps).

Process Variable 1 Min Range—This is the lower allowable limit for the primary process variable. Note that a curtailment range is typically more extreme than for normal allowable operating conditions.

Process Variable 1 Max Range—This is the maximum allowable limit for the primary process variable. Note that a curtailment range is typically more extreme than for normal allowable operating conditions.

Process Variable 2 Address—The address of the second process variable to be used to constrain the magnitude and duration of the curtailment. This information may not be required for the simplest form of the Round Robin approach. Two process variables are available for use; while not required, at least one preferably is used (example for no process variables: fountain pumps).

Process Variable 2 Min Range—This is the lower allowable limit for the secondary process variable. Note that a curtailment range is typically more extreme than for normal allowable operating conditions.

Process Variable 2 Max Range—This is the maximum allowable limit for the secondary process variable. Note that a curtailment range is typically more extreme than for normal allowable operating conditions.

AND Inclusions—This entry lists equipment that must be placed into curtailment mode simultaneously with the listed equipment entry. Circumstances for this include matched Supply Air/Return Air fan sets.

OR Exclusions—This entry lists equipment that cannot be placed into curtailment mode simultaneously with the equipment entry. Circumstances for this include shutting down all elevators simultaneously.

In this example, data sources and grouping rules are as follows. Curtailment duration and impact are determined through functional testing; the equipment is disabled and the spaces served by the units is monitored to determine the maximum duration of curtailment before space conditions fall out of acceptable range. Equipment is grouped under the following rules:

Equipment must be controllable and curtailable.
Equipment with fixed and coinciding operational schedules (during possible periods of curtailment) are required.
Curtailment durations are determined by monitoring space conditions during functional testing. Space temperature is monitored at minimum; other conditions such as IAQ ($CO_2$ levels) or relative humidity levels may also be observed to determine curtailment durations.
Equipment is grouped such that the curtailable demand for each group is approximately equal.
The functional curtailment duration for each group is the smallest duration for any individual piece of equipment within that group.
Minimal occupant impact is the basis for group priority. Example: fountains first, alternating elevators next, AHUs after.
Simultaneous, multiple group curtailments are spread across the building portfolio;
concentrations of curtailment groups within one building are not permitted.
Groups may require exclusivity. Example: all elevators may not be in the same group.
Groups may require inclusivity. Example: return and supply fan operation for the same space may be interlinked.

The flow chart of FIG. 6 is applicable to the above rotation schedule example, for a 30 kW curtailment call. Additional equipment status checks, manual override checks, etc. are performed that are not shown on FIG. 6.

EXAMPLE 2

In a hypothetical example of peak load, a virtual meter of the present invention can be compared to real meters. In this example, the combined total energy usage recorded by four meters A, B, C and D was 95 kW. However, Meter A reached its peak at 4:00 p.m. on the third day of the month, Meter B's peak occurred at 10:00 a.m. on the 12th, Meter C recorded its highest usage at noon on the 16th and Meter D recorded its peak at 6:00 p.m. on the 29th. Despite the fact that none of these peaks occurred at the same time, or even on the same day, the customer was charged for the combined total of the four.

With a virtual meter, however, there is only one recorded peak—the single point in time during the month when the customer's total aggregate usage was highest. In this example, that peak was only 80 kW, and could have occurred at any time during the billing cycle. This functionality can provide the customer the ability to negotiate with its energy supplier for a different rate or tariff and hence significantly lower the "peak load" bill. (It is noted that relations between commercial consumers and energy suppliers vary greatly, depending on whether a given market is still regulated or deregulated. The ability of a customer to win lower rates through negotiations will be highly dependent on the nature of the market and the players involved.)

EXAMPLE 3

In this Example, there is provided an energy management system according to the invention in which are used five integrated products or features:
1) Permanent Load Reduction—software intelligent agents that continually make and implement complex multi-input, device-setting decisions, and permanently reduce the amount of energy consumed by a customer.
2) Peak Load Avoidance—The use of a neural network to forecast, identify and minimize peak load events, reducing the portion of a customer's energy bill related to its peak energy usage each month. These peak load events can account for up to 50% of annual energy costs and thus their reduction is highly advantageous.

3) Virtual Meter Data Aggregation—The integration of multiple buildings and electrical meters into one virtual meter, which can eliminate multiple billings, consolidate billable peak loads and give the customer greater flexibility in managing its energy consumption. This, in turn, can create a new, reduced peak load for the aggregated portfolio that will allow for negotiations of better rates from the customer's energy supplier, thus notably reducing demand charges.

4) Capacity Savings and Emergency Curtailment—The system has the ability to rapidly reduce a customer's immediate energy usage at its request in response to short-term curtailments in energy supply. Energy consumption may be rapidly curtailed in response to requests by authorities or the energy supplier. This capability also makes it possible for a customer to sell into available markets the kilowatts of capacity it can curtail and the kilowatt-hours of energy it is able to provide back to the market during an emergency. Upon request by the local ISO, power authority or utility supplier, the IUE system will place buildings in peak curtailment operation. Non-essential loads will be de-energized and HVAC equipment will be rotated in and out of service to maintain a consistent load reduction through the curtailment period.

5) Finance—Tools for comparing actual energy usage with energy bills, which frequently overstate the amount of energy consumed by commercial customers.

In the following Examples and Comparative Examples, a number of scenarios illustrate the major issues in which ways to manage energy conventionally and according to the invention differ, and show the advantage of using intelligent agents to manage energy.

COMPARATIVE EXAMPLE C1

An automated building management system or energy management system

COMPARATIVE EXAMPLE C2

A building management system operated by an expert human engineer.

INVENTIVE EXAMPLE 4

Intelligent agents are provided according to the invention. The Intelligent agents continually learn. A "modeling neural net" is connected to each device controlled. This net has one job: learn all there is to know about this device. All parameters of this device are followed by the neural net. Minute changes in operating characteristics, due to wear and tear, aging, weather, new parameter constellations etc. are immediately picked up and become part of the "model" that the agents have of this device.

For an air conditioner, for example, the neural network knows how much power it consumes at a certain temperature setting at a certain outside temperature with a certain occupancy of the building. The net also knows this connection from other perspectives, it knows at which temperature setting, for a given occupancy and outside temperature what the power consumption would be.

The relationships between these parameters is neither linear nor easily expressable in an algebraic formula or differential equation (which are the standard ways in engineering to model systems). The neural networks work like the human mind, creating connections between concepts, which are either reinforced or weakened, depending on observation—herein called "learning", as in how children learn language or a ball game.

Continuous Learning

By knowing about every detail of operational characteristics, the intelligent agents can run the devices in the optimal fashion for the way the equipment operates right that moment. This characteristic is contrasted this to the way a conventional, automated building management system (BMS) works. Usually, the BMS does not even have a model of the device. The BMS may give fixed instructions to the device, regardless of the current efficiency or price of energy or interaction between temperature and occupancy. The BMS has put the device on a schedule, e.g go to 71 F by 7 am, and that what it will do until it is given a new schedule. At best, the BMS has resets that are based on more than one variable, e.g., outside air temperature or space air temperature. Yet the BMS still does not make predictions about future energy use, which would inform its energy management decisions. BMSs are typically set for worst case ranges, to avoid trouble calls—clearly not the smartest or most energy efficient way to run a building. It is easy to see how energy is wasted by such a rigid operation as the Comparative Example 1, that does not take changes and idiosyncrasies at the equipment level into effect. Also the case (Comparative Example 2) where a human expert controls is building management system is not much better. It is impossible for a human to monitor hundreds of devices with tens of points on every device. Imagine a building engineer in front of a monitoring console who has to track 230 air conditioners, the energy consumption of those devices, their temperature setting, the time it takes each device to change by 1 degree Fahrenheit, do that at different exterior temperatures, factor in different occupancy loads, and do that 24 hours a day. Clearly the human operator is overloaded with information.

Accuracy of Forecasting

Building management system such as Comparative Examples 1 and 2 are not used to forecast energy use. At best, these systems can look up yesterday's energy use and report that to a human user. They cannot factor this information into their own control actions. At best, Comparative Examples 1 and 2 need a human to do this. The human building managers will base their actions usually on "experience", meaning that they will look at the weather forecast and err on the save side, either overcooling a building in the summer, or overheating it in the summer. Building managers are mostly striving to please patrons, not financial managers. Even a cost-conscious building manager is lacking the inputs and the modeling power to create an accurate forecast for their buildings, device by device, floor by floor, building by building, campus by campus.

The intelligent agents of Inventive Example 4, on the other hand, leverage the learning that has occurred over time in the neural network and use it to predict energy usage exactly in that fashion. Predictions are made short term or long range device by device, building by building, portfolio by portfolio. This allows the agents to pre-cool just to the right amount. During a curtailment it allows agents to predict degradation of room temperature and gently rotate the equipment that is either being shut off or reduced. Thus the impact on building comfort is maintained, while energy cost is kept at its lowest.

Flexibility of Responses to Curtailment Requests

The conventional way as in Conventional Examples 1 and 2 to implement a curtailment response is to devise a number of curtailment stages (e.g Normal Stage, Yellow Alert Stage, Red Alert Stage). As energy becomes more scarce the possibility of a rolling black-out occurs, and higher curtailment stages are called into action. Each such curtailment stage specifies exactly how energy must be conserved. Detailed plans exist that require certain air conditioners to be set to higher temperatures or to be switched off completely. Instructions for switching off certain banks of lights or pumps or other such measures may be part of curtailment plans. One can easily see that these plans as in Comparative Examples 1 and 2 are very rigid. Clearly energy shortages do not come in three or four flavors. Yet the responses are patterned that way. The reason for this is obvious: in order to deal with the vast complexity of energy consuming devices, certain simplifications must be made to react quickly. Coarse tools, such as block-based building management systems and human operators who can only execute a limited number of operations until the curtailment level is to be met, inherently provide such limitations.

Greater flexibility is provided by the intelligent agents as used in Inventive Example 4. The agents can monitor energy price and scarcity of energy in the grid. This can happen on a extremely fine grained scale, not just green-yellow-red. Due to the agents ability to reason, they can react most appropriately even in early stages of an energy crunch. As the crunch gets more severe, agents can adopt their curtailment measures too. These curtailment measures are not the coarse measures taken be switching blocks of equipment off but try to minimize the impact on comfort and quality in the building. The agents can do this by using their knowledge about the operating characteristics of the devices and by forecasting energy need and consumption. Then the agents can take gentle control actions. While each control action may only save a minute amount of energy, compared to the sledge-hammer method of completely switching of full banks of equipment, the sum of these many minute savings equals the coarse action savings taken today by less sophisticated control systems and overworked building managers.

Wider Range of Information Inputs

Building management systems (BMS) as in the Comparative Example use simple feedback loops to control temperature or other such variables. The feedback/control variable in these loops is mostly a single, internal parameter to the system. Such an approach is too myopic to manage a system intelligently. The controller does not take a sufficiently wide range of variables into consideration. There are additional internal variables from the BMS itself (such as carbon dioxide or other air quality measures). Connected to this are occupancy date, influencing variables such as air flow or fan speed or heating in winter. Humans rarely monitor global variables from outside the building that influence major decisions which can impact cost immensely. Building managers usually do not have a display of the current price of energy. On those extreme days where the price of energy in unregulated markets shoots over the $200/kWh mark, neither the BMS on a schedule, nor the human building manager will react to this fact. While the price of energy in a deregulated market is mostly of concern to the ESCO and not the end-consumer, not preparing for flexible pricing falls short of being prudent energy management for every participant.

Intelligent agents as in Inventive Example 4 on the other hand take many global variables into consideration. The agents thus have the ability to aggressively conserve energy when it becomes extremely expensive. Thus the agents sacrifice a little building comfort when it pays heavy dividends, yet keep the building comfortable when it is cheap to do so. Knowing about events in the world of energy, and not just the local building, thus pays a return to the building owner.

Rigid Scheduling Versus Knowledge-Based Reasoning

Previously, the dynamic reasoning and decisions based on knowledge as in Inventive Example 4 have been said to be superior to fixed schedules or simple loops according to Comparative Examples 1 and 2. Yet all conventional building management systems employ exactly these basic concepts. The schedule is the preferred way to control a device in a conventional system. Even though this schedule may be very sophisticated (such as being able to distinguish weekdays from weekends, to recognize holidays, to set repeats, very much like the calendar function in Mircosoft Outlook, for example), still the conventional schedule does not ascertain whether the currently scheduled course of action makes sense under the current environmental conditions. The conventional BMS will do what is instructed to do, even if it has long gone off-course. In the scenario of energy costs skyrocketing on a particularly hot summer's day in California, the BMS will do what it is scheduled to do. It will cool the space to 68 F, even if that runs up an energy bill that is in the hundreds of thousands of dollars just for that one day.

The agents of Inventive Example 4, on the other hand, knowing the energy price, will start reasoning to find a compromise between cost and comfort. First the agents will most likely set the temperature to 71 F, then they will rotate among various zones in the building to distribute "discomfort" equally, and only when that is exhausted go to an even higher temperature to keep costs under control.

Feedback Loops

From a cybernetic point of view, current BMSs such as the Comparative Example use either simple feedback loops (keep temperature a set level) or they use triggers from simple sensors to control an action (light sensor switches on parking lot lights). Such cybernetic constructs cannot deal with diametrically opposed objectives, such as how to save as much energy as possible while keeping building comfort as high as possible.

The Inventive Example 4 has the artificial intelligence tools to balance opposed objectives, such as energy saving and building comfort.

Blocks

The Comparative Example building management system is created on the metaphor of its predecessor—electromechanical systems. End-users are presented with "blocks" which may represent relays and other such physical entities. On a higher level control blocks represent blocks of panels or devices. While this metaphor is initially helpful for a building manager to make the transition from the physical world to systems controlled by microprocessors, it does eventually limits what the system can do.

Inventive Example 4 is not subject to such eventual limitations.

Trial and Error

Some BMSs and even some domestic thermostats claim they can "learn". What most of these devices are actually doing is a stochastic approximation approach—in other words: they are guessing. Guessing a value can be very wasteful, taking many "stabs" until a somewhat satisfactory value is found. Guessing also allows no transfer from one learning event to the next. The Comparative Example suffers from the costs of trial and error.

In Inventive Example 1, true learning (observation and the creation of a knowledge base) occurs, such as by neural networks and rule-based expert systems. Due to such true learning, the system in Inventive Example 1 therefore come up with the right answer faster, more accurately and in a wider range of learning situations than the Comparative Examples.

The differences between the Comparative Examples 1 and 2 and Inventive Example 4 are summarized as follows. Inventive Example 1 using intelligent agents surpasses both, automated building management systems (Comparative Example 1) and human experts (Comparative Example 2) in delivering better building comfort at less cost. The table below summarizes these findings.

| Concept | Intelligent Agents driving a BMS | Human Expert driving a BMS | Automatic BMS |
|---|---|---|---|
| Learning operational specifics of devices [how to run air conditioners, pumps etc. most efficiently] | Constant observation of every single device updates the neural network for that device continually; up-to-date representation of the device | Common sense of operational characteristics; macro level only, can not follow all points on all devices in detail for 24 hours per day. | At best a fixed parametric description of a device; no learning or updating. Usually no modeling of device parameters. |
| Forecasting energy usage [saving money by doing necessary cooling/heating actions when energy is cheap] | Neural nets can make accurate predictions based on historic observations. | Human can make educated guess based on experience; usually can not take all datapoints into account due to information overload and non-linear nature of forecasting formulas. | At best lookup in a database, very inaccurate; usually no forecasting. |
| Dealing with curtailments [keeping good building comfort while responding to curtailments] | Infinitely small levels of automatic response to tightening energy supply; | Brute force; using predefined groups of devices to switch off in increasing stages of severity | None; needs human operator. |
| Day to day operation of devices [Running the building in the most energy efficient manner] | Constant observation of every single device updates the neural network for that device continually; up-to-date representation of the device | Operates BMS on macro level; can not dedicate full 8 hours to drive system; unable to deal with flow of information (up to 150 Mb/minute) | According to a fixed schedule (e.g. set A/C to 70 F. at 6 am) or a single event (e.g. parking lots light go on when it is dark); no tactical optimization. |
| Context for decision making [being pound-wise, not penny foolish] | Use all local feeds from building (e.g temperature, humidity, CO2, etc.); use weather forecasts from NOAA; use price feeds from ISOs; | Not all global information feeds accessible to building manager; decisions made with incomplete data on a guesswork basis | Use local sensor readings only for simple feedback loop |
| Decision making methods | Forward and backward reasoning using neural networks, rule-based systems, and plan-based systems; | Intelligent decision making using reasoning and "common sense" | Simple feedback loops with single control parameter |
| Granularity of Control | Every device has an agent attached which in turn can be leveraged by higher level strategy agents; this allows to implement many different strategies, independent of physical "control blocks" | Limited by the control level provided by the BMS | Controlling via "blocks" and other electro-mechanical metaphors that do not utilize the full flexibility of computerized systems |
| Automatic determination of parameters | Neural networks continually use monitoring as input to learning; system never guesses but uses reasoning based on historic facts. | Based on experience and observations; prone to misjudgements and effects of exponential effects (humans can only estimate linear systems well). | Trial and error to deduce pre-cooling or pre-heating times wastes energy and does not adapt to changes in the building or the environment (weather) |
| Control over multiple buildings | Agents can leverage multiple devices and therefore have more degrees of freedom in finding the best compromise between savings and comfort | Restricted to a single building via the current BMS. | Restricted to a single building. If umbrella system exist than only for monitoring. |

The basis of comparison is both, the cost of energy consumed in the scenario and the comfort level achieved for the tenants.

The scenarios show that agents can run a building more effectively and efficiently due to the following reasons:

Continuous learning: Intelligent agents operate equipment more efficiently and effectively by automatically learning the operating characteristics of devices via a neural network approach is. This is faster, more accurate, and more representative of the current state of the device than preprogramming a building management system with static, manufacturer supplied parameters or specs for the device, which may not represent the current condition of the actual device.

Accurate forecasting: Intelligent agents save money by using their device knowledge to make knowledgeable energy forecasts which result in savings rather than operating on a fixed schedule regardless of temperature forecasts or changing energy prices.

Flexible response to curtailment requests: Intelligent agents can achieve higher comfort levels for tenants during curtailment events since they do not rely on predetermined "shut down" groups or sequences, which are the only way building management systems or humans can handle these complex requests for curbing energy use.

Wider information context: Since agents have access to a wider context to base their decisions on, they can save more money than a building management system. The building management system is constrained to data that comes from the building itself, while the agents can leverage subscriptions to the NOAA (national oceanographic and atmospheric administration) or to various price feeds from ISOs.

Reasoning wins over scheduling: Agents can run the equipment more effectively and efficiently on a day to day basis. The agents can do this, since they have the ability to reason about causes and trade-offs react flexibly to events in the building itself (temperature, $CO_2$, occupancy, etc.) and to global changes (weather data, price of energy). Building management systems are usually on a schedule, where they take control actions, regardless of occupancy or the price of energy. This makes building management systems less efficient.

Reasoning is more powerful than feedback loops: From a cybernetic point of view, current BMSs use either simple feedback loops (keep temperature a set level) or they use triggers from simple sensors to control an action (light sensor switches on parking lot lights). Such cybernetic constructs can not deal with diametrically opposed objectives, namely to save as much energy as possible while keeping building comfort as high as possible. It takes domain knowledge, learning, and decision making intelligence in a system to accomplish this.

Conventional block control is cumbersome: Most building management systems have been created on the metaphor of their predecessors—electromechanical systems. End-users are presented with "blocks" which may represent relays and other such physical entities. On a higher level control blocks represent blocks of panels or devices. While this metaphor is initially helpful for a building manager to make the transition from the physical world to systems controlled by microprocessors, it does eventually limits what the system can do.

Intelligent learning is more cost effective than trial-and-error: While some conventional BMSs and even some domestic thermostats claim they can "learn", what most of these devices actually are doing is a stochastic approximation approach—in other words: they are guessing. Guessing a value can be very wasteful, taking many "stabs" until a somewhat satisfactory value is found. Guessing also allows no transfer from one learning event to the next. True learning on the other hand requires observation and the creation of a knowledge base. Neural networks and rule-based expert systems can do this and therefore come up with the right answer faster, more accurately and in a wider range of learning situations.

Agents control more than one building: While traditional BMSs merely schedule and monitor the actions in a single building, our agents control devices, such as HVAC or lighting across a whole portfolio of buildings. This prevents the agents from merely finding local maxima but allow them to globally optimize. It also equips the agents with increased degrees of freedom in balancing energy savings requirements with tenant comfort across buildings.

While various embodiments of the present invention have been shown and described, it should be understood that other modifications, substitutions and alternatives may be made by one of ordinary skill in the art without departing from the spirit and scope of the invention, which should be determined from the appended claims.

What we claim is as follows:

1. A method of managing energy usage in a building system, comprising:
    managing energy usage history data of a plurality of energy consumption devices in the building system, the energy usage history data comprising one or more energy usage peaks previously reached by the building system;
    monitoring current energy usage of the plurality of energy consumption devices in the building system;
    monitoring a plurality of global variables comprising a building temperature, a building humidity, a building $CO_2$ level, a weather forecast and a real-time energy price;
    forecasting whether or not a new energy usage peak is approaching based on the current energy usage and the energy usage history data; and
    automatically initiating a real-time control of each energy consumption device based on the plurality of global variables in response to a forecast that a new energy usage peak is approaching.

2. The method of claim 1, wherein the building system comprises at least two buildings.

3. The method of claim 1, wherein the managing the energy usage history data comprises:
    compiling the current energy usage to generate the energy usage history data of the building system; and
    determining one or more energy usage patterns from the energy usage history data, and
    wherein the forecasting whether or not a new energy usage peak is approaching comprises comparing the current energy usage with the one or more energy usage patterns.

4. The method of claim 1, wherein the forecasting whether or not a new energy usage peak is approaching is based on neural network based prediction.

5. The method of claim 1, wherein the forecasting whether or not a new energy usage peak is approaching involves no human operator intervention.

6. The method of claim 1, wherein the monitoring the current energy usage comprises collecting energy usage data from the plurality of energy consumption devices in the building system.

7. The method of claim 1, wherein the monitoring the current energy usage comprises collecting energy usage data from one or more energy usage monitoring sources, wherein the one or more energy usage monitoring sources comprises at least one of a sensing device and an electric meter used for billing.

8. The method of claim 7, wherein the plurality of global variables further comprise one or more energy usage patterns of each energy consumption device and an occupancy of a portion of the building system where each energy consumption device is located.

9. A computer for managing energy usage in a building system, comprising:
    a data management unit configured to manage energy usage history data of a plurality of energy consumption devices in the building system, the energy usage history data comprising one or more energy usage peaks previously reached by the building system;
    a first monitoring unit configured to monitor current energy usage of the plurality of eneroy consumption devices in the building system;
    a second monitoring unit configured to monitor a pluralty of global variables comprising a building temperature, a building humidity, a building $CO_2$ level, a weather forecast and a real-time energy price;
    a forecasting unit configured to forecast whether or not a new energy usage peak is approaching based on the current energy usage and the energy usage history data; and
    a control unit configured to automatically initiate a real-time control of each energy consumption device based on the plurality of global variables in response to a forecast that a new energy usage peak is approaching.

10. The computer of claim 9, wherein the building system comprises at least two buildings.

11. The computer of claim 9, wherein the data management unit comprises:
   a compilation unit for compiling the current energy usage of the building system to generate the energy usage history data; and
   a data processing unit for determining one or more energy usage patterns from the energy usage history data, and
   wherein the forecasting unit compares the current energy usage with the one or more energy usage patterns to forecast if a new energy usage peak is approaching.

12. The computer of claim 9, wherein the forecasting unit forecasts whether or not a new energy usage peak is approaching based on neural network based prediction.

13. The computer of claim 9, wherein the forecasting unit forecasts whether or not a new energy usage peak is approaching without human operator ntervention.

14. The computer of claim 9, wherein the first monitoring unit collects energy usage data from the plurality of energy consumption devices in the building system.

15. The computer of claim 9, wherein the first monitoring unit collects energy usage data from one or more energy usage monitoring sources comprising at least one of a sensing device and an electric meter.

16. The computer of claim 9, wherein the plurality of global variables further comprise one or more energy usage patterns of each energy consumption device and an occupancy of a portion of the building system where each energy consumption device is located.

* * * * *